(12) United States Patent  
Grout et al.

(10) Patent No.: US 12,497,587 B2  
(45) Date of Patent: Dec. 16, 2025

(54) BIOREACTORS AND METHODS OF THEIR USE IN AUTOMATIC CELL PROCESSING SYSTEMS

(71) Applicant: Cellares Corporation, South San Francisco, CA (US)

(72) Inventors: Wayne E. Grout, Oakland, CA (US); Wilson Wai Toy, San Francisco, CA (US)

(73) Assignee: Cellares Corporation, South San Francisco, CA (US)

( * ) Notice: Subject to any disclaimer, the term of this patent is extended or adjusted under 35 U.S.C. 154(b) by 0 days.

(21) Appl. No.: 18/810,386

(22) Filed: Aug. 20, 2024

(65) Prior Publication Data

US 2025/0066709 A1 Feb. 27, 2025

Related U.S. Application Data

(60) Provisional application No. 63/520,858, filed on Aug. 21, 2023.

(51) Int. Cl.
*C12M 1/00* (2006.01)
*C12M 1/06* (2006.01)
(Continued)

(52) U.S. Cl.
CPC ............ *C12M 47/04* (2013.01); *C12M 23/40* (2013.01); *C12M 23/42* (2013.01); *C12M 27/02* (2013.01);
(Continued)

(58) Field of Classification Search
CPC ...... C12M 47/04; C12M 23/40; C12M 23/42; C12M 27/02; C12M 41/26; C12M 41/32;
(Continued)

(56) References Cited

U.S. PATENT DOCUMENTS 3,728,227 A 4/1973 Elson et al.
4,234,023 A 11/1980 Sogi et al.
(Continued)

FOREIGN PATENT DOCUMENTS

CN 104203333 A 12/2014
CN 108660060 A 10/2018
(Continued)

OTHER PUBLICATIONS

ChargePoint (2021). Aseptic split butterfly valve 10-6 sterility assurance, located at https://www.thechargepoint.com/products/aseptic-split-butterfly-valve-10-6-sterility-assurance/, 2 total pages.
(Continued)

*Primary Examiner* — Michael L Hobbs
(74) *Attorney, Agent, or Firm* — Cooley LLP

(57) ABSTRACT

The present disclosure relates to systems, devices, and methods for automated cell processing within a cell processing system. In an embodiment, the present disclosure relates to a cartridge comprising a bioreactor module comprising a bioreactor, a first thermal compartment positioned adjacent the bioreactor, and a second thermal compartment positioned adjacent the bioreactor, and a fluidic manifold coupling the first and second thermal compartments to the bioreactor.

27 Claims, 9 Drawing Sheets

(51) Int. Cl.
*C12M 1/34* (2006.01)
*C12M 1/36* (2006.01)
*C12M 3/00* (2006.01)

(52) U.S. Cl.
CPC ............ *C12M 41/26* (2013.01); *C12M 41/32* (2013.01); *C12M 41/34* (2013.01); *C12M 41/48* (2013.01)

(58) Field of Classification Search
CPC ......... C12M 41/34; C12M 41/48; B01L 7/00; B01L 7/52
See application file for complete search history.

(56) References Cited

U.S. PATENT DOCUMENTS

| | | |
|---|---|---|
| 4,696,902 A | 9/1987 | Bisconte |
| 4,839,292 A | 6/1989 | Cremonese |
| 4,911,833 A | 3/1990 | Schoendorfer et al. |
| 5,058,619 A | 10/1991 | Zheng |
| 5,656,491 A | 8/1997 | Cassani et al. |
| 6,374,684 B1 | 4/2002 | Dority |
| 6,649,419 B1 | 11/2003 | Anderson |
| 7,521,224 B2 | 4/2009 | Johnson et al. |
| 7,550,287 B2 | 6/2009 | Hibino et al. |
| 7,745,209 B2 | 6/2010 | Martin et al. |
| 7,816,128 B2 | 10/2010 | Nakashima et al. |
| 8,158,426 B2 | 4/2012 | Wilson et al. |
| 8,158,427 B2 | 4/2012 | Wilson et al. |
| 8,168,432 B2 | 5/2012 | Wilson et al. |
| 8,273,572 B2 | 9/2012 | Martin et al. |
| 8,415,144 B2 | 4/2013 | Wilson et al. |
| 8,440,458 B2 | 5/2013 | Zijlstra et al. |
| 8,470,589 B2 | 6/2013 | Martin et al. |
| 8,492,140 B2 | 7/2013 | Smith et al. |
| 8,546,142 B2 | 10/2013 | Martin et al. |
| 8,697,443 B2 | 4/2014 | Wilson et al. |
| 8,727,132 B2 | 5/2014 | Miltenyi et al. |
| 8,809,044 B2 | 8/2014 | Wilson |
| 8,846,399 B2 | 9/2014 | Martin et al. |
| 8,956,860 B2 | 2/2015 | Vera et al. |
| 9,040,290 B2 | 5/2015 | Martin et al. |
| 9,045,721 B2 | 6/2015 | Martin et al. |
| 9,080,149 B2 | 7/2015 | Bosio et al. |
| 9,255,243 B2 | 2/2016 | Wilson et al. |
| 9,279,099 B2 | 3/2016 | Okano et al. |
| 9,290,730 B2 | 3/2016 | Martin et al. |
| 9,410,114 B2 | 8/2016 | Wilson et al. |
| 9,441,192 B2 | 9/2016 | Wilson et al. |
| 9,499,780 B2 | 11/2016 | Smith et al. |
| 9,534,195 B2 | 1/2017 | Smith et al. |
| 9,556,485 B2 | 1/2017 | Lin et al. |
| 9,567,565 B2 | 2/2017 | Vera et al. |
| 9,597,355 B2 | 3/2017 | Magnant |
| 9,625,463 B2 | 4/2017 | Miltenyi et al. |
| 9,701,932 B2 | 7/2017 | Smith et al. |
| 9,732,317 B2 | 8/2017 | Wilson |
| 9,783,768 B2 | 10/2017 | Larcher et al. |
| 9,845,451 B2 | 12/2017 | Martin et al. |
| 10,047,342 B2 | 8/2018 | Eibl et al. |
| 10,053,663 B2 | 8/2018 | Kabaha et al. |
| 10,119,970 B2 | 11/2018 | Miltenyi et al. |
| 10,131,876 B2 | 11/2018 | Kaiser et al. |
| 10,253,316 B2 | 4/2019 | Masquelier et al. |
| 10,294,658 B2 | 5/2019 | Scannon et al. |
| 10,323,258 B2 | 6/2019 | Bernate et al. |
| 10,329,559 B1 | 6/2019 | Masquelier et al. |
| 10,385,307 B2 | 8/2019 | Rowley et al. |
| 10,421,959 B1 | 9/2019 | Masquelier et al. |
| 10,508,288 B1 | 12/2019 | Bernate et al. |
| 10,519,437 B1 | 12/2019 | Masquelier et al. |
| 10,533,156 B2 | 1/2020 | Vera et al. |
| 10,584,333 B1 | 3/2020 | Masquelier et al. |
| 10,584,334 B1 | 3/2020 | Masquelier et al. |
| 10,584,354 B2 | 3/2020 | Wilson |
| 10,588,994 B2 | 3/2020 | Kawamura et al. |
| 10,620,212 B2 | 4/2020 | Miltenyi et al. |
| 10,689,669 B1 | 6/2020 | Feldman et al. |
| 10,705,090 B2 | 7/2020 | Miltenyi et al. |
| 10,705,091 B2 | 7/2020 | Miltenyi et al. |
| 10,723,986 B2 | 7/2020 | Smith et al. |
| 10,724,043 B2 | 7/2020 | Sixto et al. |
| 10,844,338 B1 | 11/2020 | Smith et al. |
| 11,161,111 B2 | 11/2021 | Kabaha et al. |
| 11,198,845 B2 | 12/2021 | Parietti et al. |
| 11,371,018 B2 | 6/2022 | Shi et al. |
| 11,376,587 B2 | 7/2022 | Thakkar et al. |
| 11,447,745 B2 | 9/2022 | Shi et al. |
| 11,613,725 B2 | 3/2023 | Wilson et al. |
| 11,701,654 B2 | 7/2023 | Azersky et al. |
| 11,786,896 B2 | 10/2023 | Thakkar et al. |
| 11,826,756 B2 | 11/2023 | Azersky et al. |
| 11,872,557 B2 | 1/2024 | Biz et al. |
| 12,157,119 B2 | 12/2024 | Gerlinghaus et al. |
| 12,180,453 B2 | 12/2024 | Chang et al. |
| 12,305,156 B2 | 5/2025 | Burkeen et al. |
| 12,337,321 B2 | 6/2025 | Malleo et al. |
| 12,350,664 B2 | 7/2025 | Pesch et al. |
| 12,350,667 B2 | 7/2025 | Azersky et al. |
| 12,350,668 B2 | 7/2025 | Azersky et al. |
| 2002/0146817 A1 | 10/2002 | Cannon et al. |
| 2003/0030272 A1 | 2/2003 | Johnson et al. |
| 2004/0121454 A1 | 6/2004 | Jury et al. |
| 2005/0070018 A1 | 3/2005 | Johnson et al. |
| 2005/0186671 A1 | 8/2005 | Cannon et al. |
| 2005/0260743 A1 | 11/2005 | Drake et al. |
| 2006/0194193 A1 | 8/2006 | Tsuruta et al. |
| 2006/0257999 A1 | 11/2006 | Chang et al. |
| 2007/0185472 A1 | 8/2007 | Baumfalk et al. |
| 2008/0057568 A1 | 3/2008 | Kan et al. |
| 2008/0176318 A1 | 7/2008 | Wilson et al. |
| 2009/0042281 A1 | 2/2009 | Chang et al. |
| 2009/0053799 A1 | 2/2009 | Chang-Yen et al. |
| 2009/0247417 A1 | 10/2009 | Haas et al. |
| 2010/0130732 A1 | 5/2010 | Chung et al. |
| 2010/0151571 A1* | 6/2010 | Vukasinovic .......... C12M 41/12 435/303.1 |
| 2011/0003380 A1 | 1/2011 | Miltenyi et al. |
| 2011/0229927 A1* | 9/2011 | Larsen .................. C12M 41/34 435/287.1 |
| 2012/0138156 A1 | 6/2012 | Hofman et al. |
| 2013/0115617 A1 | 5/2013 | Wilson |
| 2014/0309795 A1 | 10/2014 | Norton et al. |
| 2015/0307829 A1 | 10/2015 | Dedry et al. |
| 2015/0336096 A1 | 11/2015 | Smith et al. |
| 2016/0208216 A1 | 7/2016 | Vera et al. |
| 2016/0244714 A1 | 8/2016 | Spuhler et al. |
| 2016/0303563 A1 | 10/2016 | Granier et al. |
| 2016/0320381 A1 | 11/2016 | Holmes et al. |
| 2016/0320422 A1 | 11/2016 | Fritchie et al. |
| 2017/0058527 A1 | 3/2017 | Williams et al. |
| 2017/0307502 A1 | 10/2017 | Mason et al. |
| 2017/0313977 A1 | 11/2017 | Wilson |
| 2017/0321226 A1 | 11/2017 | Gill et al. |
| 2017/0348525 A1 | 12/2017 | Sano et al. |
| 2017/0362554 A1 | 12/2017 | Martin et al. |
| 2018/0031592 A1 | 2/2018 | Dority |
| 2018/0051243 A1 | 2/2018 | Hogan et al. |
| 2018/0078935 A1 | 3/2018 | Hung et al. |
| 2018/0196918 A1 | 7/2018 | Sadowski et al. |
| 2019/0144826 A1 | 5/2019 | Leen et al. |
| 2019/0212233 A1 | 7/2019 | Jovanovich et al. |
| 2019/0264176 A1 | 8/2019 | Leen et al. |
| 2019/0275519 A1 | 9/2019 | Castillo et al. |
| 2019/0292510 A1 | 9/2019 | Tandon et al. |
| 2019/0293673 A1 | 9/2019 | Wescott et al. |
| 2019/0316120 A1 | 10/2019 | Masquelier et al. |
| 2019/0330579 A1 | 10/2019 | Guenat et al. |
| 2019/0345444 A1 | 11/2019 | Rosenberg et al. |
| 2020/0009557 A1 | 1/2020 | Frigard et al. |
| 2020/0025782 A1 | 1/2020 | Ahlfors |
| 2020/0048599 A1 | 2/2020 | Firouzi et al. |
| 2020/0095550 A1 | 3/2020 | Vera et al. |
| 2020/0159198 A1 | 5/2020 | Kapre et al. |

(56) References Cited

U.S. PATENT DOCUMENTS

| | | |
|---|---|---|
| 2020/0224147 A1 | 7/2020 | Rogers et al. |
| 2020/0283713 A1 | 9/2020 | Ball et al. |
| 2020/0292552 A1 | 9/2020 | Miltenyi et al. |
| 2020/0353004 A1 | 11/2020 | Nowak et al. |
| 2020/0368411 A1 | 11/2020 | Camisani et al. |
| 2020/0399578 A1 | 12/2020 | Corso et al. |
| 2020/0406221 A1 | 12/2020 | Dabrowski et al. |
| 2021/0001339 A1 | 1/2021 | Liu et al. |
| 2021/0032583 A1 | 2/2021 | Smith et al. |
| 2021/0035655 A1 | 2/2021 | Tanouchi et al. |
| 2021/0047668 A1 | 2/2021 | Dabrowski et al. |
| 2021/0079344 A1 | 3/2021 | Bosio et al. |
| 2021/0147807 A1 | 5/2021 | Lickert et al. |
| 2021/0253997 A1 | 8/2021 | Wilson |
| 2021/0269755 A1 | 9/2021 | Smith et al. |
| 2021/0283565 A1 | 9/2021 | Gerlinghaus et al. |
| 2021/0284948 A1 | 9/2021 | Hauwaerts et al. |
| 2021/0301239 A1 | 9/2021 | Natsume et al. |
| 2021/0324318 A1 | 10/2021 | Parietti et al. |
| 2021/0354104 A1 | 11/2021 | Pesch et al. |
| 2022/0047862 A1 | 2/2022 | Chang et al. |
| 2022/0127558 A1 | 4/2022 | Sowwan et al. |
| 2022/0143610 A1 | 5/2022 | Biz et al. |
| 2022/0150650 A1 | 5/2022 | Rucker |
| 2022/0282199 A1 | 9/2022 | Vann |
| 2022/0325219 A1 | 10/2022 | Parietti et al. |
| 2022/0325240 A1 | 10/2022 | McFarland et al. |
| 2022/0347683 A1 | 11/2022 | Thakkar et al. |
| 2023/0051840 A1 | 2/2023 | Kelso et al. |
| 2023/0149922 A1 | 5/2023 | Thakkar et al. |
| 2023/0321650 A1 | 10/2023 | Azersky et al. |
| 2023/0415154 A1 | 12/2023 | Pesch et al. |
| 2023/0415155 A1 | 12/2023 | Biz et al. |
| 2024/0165613 A1 | 5/2024 | Azersky et al. |
| 2024/0254426 A1 | 8/2024 | Elpel et al. |
| 2024/0255537 A1 | 8/2024 | Malleo et al. |
| 2024/0279585 A1 | 8/2024 | Griffin et al. |
| 2024/0279588 A1 | 8/2024 | Malleo et al. |
| 2024/0318116 A1 | 9/2024 | Chang et al. |
| 2024/0326043 A1 | 10/2024 | Gerlinghaus et al. |
| 2024/0369586 A1 | 11/2024 | Tian et al. |
| 2024/0377420 A1 | 11/2024 | Cesarek |
| 2024/0390897 A1 | 11/2024 | Azersky et al. |
| 2024/0390898 A1 | 11/2024 | Azersky et al. |
| 2024/0399365 A1 | 12/2024 | Biz et al. |
| 2024/0402206 A1 | 12/2024 | Boppart et al. |
| 2025/0002837 A1 | 1/2025 | Bharat |
| 2025/0059492 A1 | 2/2025 | Beban et al. |
| 2025/0065331 A1 | 2/2025 | Malleo et al. |
| 2025/0066708 A1 | 2/2025 | Burkeen et al. |
| 2025/0129321 A1 | 4/2025 | Malleo et al. |
| 2025/0207076 A1 | 6/2025 | Marchiando et al. |
| 2025/0236832 A1 | 7/2025 | Chang et al. |

FOREIGN PATENT DOCUMENTS

| | | |
|---|---|---|
| EP | 0246912 A2 | 11/1987 |
| EP | 0991389 A1 | 4/2000 |
| EP | 0824380 B1 | 1/2002 |
| EP | 3134512 B1 | 1/2019 |
| EP | 2809449 B1 | 10/2019 |
| EP | 3359294 B1 | 5/2020 |
| EP | 3928867 A1 | 12/2021 |
| GB | 2268187 A | 1/1994 |
| JP | 2007325586 A | 12/2007 |
| KR | 20130018286 A | 2/2013 |
| KR | 20220131302 A | 9/2022 |
| WO | WO-2006102416 A2 | 9/2006 |
| WO | WO-2006112870 A1 | 10/2006 |
| WO | WO-2006118282 A1 | 11/2006 |
| WO | WO-2007139742 A1 | 12/2007 |
| WO | WO-2009072003 A2 | 6/2009 |
| WO | WO-2017041051 A1 | 3/2017 |
| WO | WO-2017123663 A1 | 7/2017 |
| WO | WO-2018015561 A1 | 1/2018 |
| WO | WO-2018102471 A1 | 6/2018 |
| WO | WO-2019232504 A2 | 12/2019 |
| WO | WO-2020009700 A1 | 1/2020 |
| WO | WO-2020014264 A1 | 1/2020 |
| WO | WO-2021168368 A1 | 8/2021 |
| WO | WO-2021183687 A2 | 9/2021 |
| WO | WO-2021212124 A1 | 10/2021 |
| WO | WO-2024112702 A1 | 5/2024 |
| WO | WO-2024197093 A2 | 9/2024 |
| WO | WO-2025038974 A1 | 2/2025 |
| WO | WO-2025041046 A1 | 2/2025 |
| WO | WO-2025041047 A1 | 2/2025 |
| WO | WO-2025041064 A2 | 2/2025 |

OTHER PUBLICATIONS

CPC (2014). "6 traits of non-spill: How quick disconnect couplings evolved for low-pressure fluid handling," White Paper 8004, 4 total pages.

CPC (2014). "How single-use connections advance aseptic processing: Increased process flexibility and reliability, reduced costs," White Paper 7004, 6 total pages.

CPC (2018). Comparison Guide: Tube Welders and Aseptic Connectors, Technical Guide 7009, 3 total pages.

EMD Millipore (2015). "Lynx® S2S Connector—Low temperature compatibility (−80"C)," 4 total pages.

Final Office Action for U.S. Appl. No. 17/331,554 mailed Aug. 29, 2024, 18 pages.

Final Office Action for U.S. Appl. No. 18/652,602 mailed Nov. 1, 2024, 29 pages.

Final Office Action for U.S. Appl. No. 18/799,963 mailed Jan. 30, 2025, 10 pages.

Final Office Action mailed on Apr. 28, 2022, for U.S. Appl. No. 17/198,134, filed Mar. 10, 2021, 11 pages.

Final Office Action mailed on Apr. 28, 2022, for U.S. Appl. No. 17/331,554, filed May 26, 2021, 16 pages.

Final Office Action mailed on Jul. 31, 2023, for U.S. Appl. No. 17/331,554, filed May 26, 2021, 19 pages.

Final Office Action mailed on Mar. 31, 2023, for U.S. Appl. No. 17/579,478, filed Jan. 19, 2022, 8 pages.

Garcia et al., "Microfluidic Screening of Electric Fields for Electroporation" Sci Rep. Feb. 19, 2016; 6:21238. pages 1-11.

Genetic Engineering & Biotechnology News (2006). "Thermal welding for sterile connections," located at https://www.genengnews.com/magazine/47/thermal-welding-for-sterile-connections/, 5 total pages.

International Search Report and Written Opinion for International Application No. PCT/IB2024/058106 mailed Jan. 21, 2025, 13 pages.

International Search Report and Written Opinion for International Application No. PCT/IB2024/058148 mailed Mar. 3, 2025, 21 pages.

International Search Report and Written Opinion for International Application No. PCT/US2023/080593 dated Mar. 21, 2024, 12 pages.

International Search Report and Written Opinion for PCT Application No. PCT/IB2024/058105 mailed Dec. 16, 2024, 12 pages.

International Search Report and Written Opinion for PCT Application No. PCT/US2024/042795 mailed Dec. 16, 2024, 11 pages.

International Search Report mailed on Oct. 13, 2021, for PCT Application No. PCT/US2021/021773, filed on Mar. 10, 2021, 13 pages.

Invitation to Pay Additional fees for International Application No. PCT/IB2024/058148, mailed Jan. 2, 2025, 13 pages.

Invitation to Pay Additional fees for International Application No. PCT/US2024/020809, mailed Jan. 27, 2025, 17 pages.

Jain, S. et al. (2011). "The complete automation of cell culture: improvements for high-throughput and high-content screening," J. Biomol. Screen 16:932-939.

Kato, R. et al. (2010). "A Compact, Automated Cell Culture System for Clinical Scale Cell Expansion from Primary Tissues," Tissue Engineering: Part C 16:947-956.

(56) References Cited

OTHER PUBLICATIONS

Kempner, M.E. and Felder, R.A., "A review of cell culture automation". JALA: Journal of the Association for Laboratory Automation (Apr. 2002); 7(2): 56-62.
Kino-Oka, M. et al. (2005). "Bioreactor Design for Successive Culture of Anchorage-Dependent Cells Operated in an Automated Manner," Tissue Engineering 11:535-545.
Knoll, A. et al. (2004). "Flexible automation of cell culture and tissue engineering tasks," Biotechnol. Prog. 20:1825-1835.
Lutkemeyer, D. et al. (2000). "First steps in robot automation of sampling and sample management during cultivation of mammalian cells in pilot scale," Biotechnol. Prog. 16:822-828.
MEDInstill (2021). INTACT™ Connectors, located at https://www.medinstill.com/intactconnectors.php, 1 total page.
Millipore® (2020). "Technical Brief—Choosing the right sterile connector based on design and sterility test results," 4 total pages.
Millipore Sigma (2020). "Lynx® CDR Connectors," Datasheet, 4 total pages.
Millipore Sigma (2021). Lynx® CDR Connectors, located at https://www.emdmillipore.com/us/en/product/Lynx-CDR-Connectors,MM_NF-C188801, 2 total pages.
Non-Final Office Action for U.S. Appl. No. 18/244,051 mailed Oct. 9, 2024, 10 pages.
Non-Final Office Action for U.S. Appl. No. 18/652,602 mailed Jul. 17, 2024, 30 pages.
Non-Final Office Action for U.S. Appl. No. 18/792,358 mailed on Nov. 6, 2024, 5 pages.
Non-Final Office Action for U.S. Appl. No. 18/799,963 mailed Sep. 30, 2024, 9 pages.
Non-Final Office Action for U.S. Appl. No. 18/988,628 mailed Mar. 3, 2025, 19 pages.
Non-Final Office Action mailed on Apr. 24, 2024, for U.S. Appl. No. 17/331,554, filed May 26, 2021, 17 pages.
Non-Final Office Action mailed on Dec. 22, 2022, for U.S. Appl. No. 17/579,478, filed Jan. 19, 2022, 8 pages.
Non-Final Office Action mailed on Dec. 3, 2021, for U.S. Appl. No. 17/331,556, filed May 26, 2021, 9 pages.
Non-Final Office Action mailed on Feb. 3, 2022, for U.S. Appl. No. 17/198,134, filed Mar. 10, 2021, 5 pages.
Non-Final Office Action mailed on Jun. 26, 2023, for U.S. Appl. No. 17/198,134, filed Mar. 10, 2021, 15 pages.
Non-Final Office Action mailed on Mar. 16, 2023, for U.S. Appl. No. 17/331,554, filed May 26, 2021, 16 pages.
Non-Final Office Action mailed on May 14, 2024, for U.S. Appl. No. 18/611,632, filed Mar. 20, 2024, 13 pages.
Non-Final Office Action mailed on Oct. 28, 2021, for U.S. Appl. No. 17/331,554, filed May 26, 2021, 11 pages.
Non-Final Office Action mailed on Oct. 6, 2021, for U.S. Appl. No. 17/198,134, filed on Mar. 10, 2021, 7 pages.
Non-Final Office Action mailed on Sep. 13, 2023, for U.S. Appl. No. 18/141,329, filed Apr. 28, 2023, 7 pages.
Notice of Allowance (Corrected) mailed on Sep. 5, 2024, for U.S. Appl. No. 18/611,632, filed Mar. 20, 2024, 6 pages.
Notice of Allowance for U.S. Appl. No. 17/331,554 mailed Mar. 5, 2025, 8 pages.
Notice of Allowance for U.S. Appl. No. 18/487,884 mailed Feb. 26, 2025, 8 pages.
Notice of Allowance for U.S. Appl. No. 18/611,632 mailed Aug. 26, 2024, 9 pages.
Notice of Allowance for U.S. Appl. No. 18/792,358 mailed on Mar. 3, 2025, 8 pages.
Notice of allowance for U.S. Appl. No. 18/792,360 mailed Mar. 4, 2025, 9 pages.
Notice of Allowance for U.S. Appl. No. 18/792,360 mailed on Jan. 29, 2025, 9 pages.
Notice of Allowance for U.S. Appl. No. 18/810,388 mailed Jan. 21, 2025, 8 pages.
Notice of Allowance for U.S. Appl. No. 18/810,388 mailed on Oct. 9, 2024, 9 pages.
Notice of allowance for U.S. Appl. No. 18/811,490 mailed Feb. 26, 2025, 8 pages.
Notice of Allowance for U.S. Appl. No. 18/811,490 mailed on Dec. 12, 2024, 8 pages.
Notice of Allowance mailed on Apr. 11, 2024, for U.S. Appl. No. 17/198,134, filed Mar. 10, 2021, 9 pages.
Notice of Allowance mailed on Jul. 18, 2023, for U.S. Appl. No. 17/849,422, filed Jun. 24, 2022, 8 pages.
Notice of Allowance mailed on Jul. 25, 2023, for U.S. Appl. No. 17/579,478, filed Jan. 19, 2022, 8 pages.
Notice of Allowance mailed on Jun. 8, 2023, for U.S. Appl. No. 17/849,422, filed Jun. 24, 2022, 8 pages.
Notice of Allowance mailed on Mar. 1, 2022, for U.S. Appl. No. 17/331,556, filed May 26, 2021, 8 pages.
Notice of Allowance mailed on Mar. 22, 2023, for U.S. Appl. No. 17/992,784, filed Nov. 22, 2022, 8 pages.
Notice of Allowance mailed on Oct. 4, 2023, for U.S. Appl. No. 18/141,329, filed Apr. 28, 2023, 8 pages.
Pharma Japan, "Astellas Set to Cut Development Time with Cell Culture Robot, Eyes 4 Billion Yen Profit per Product" Aug. 9, 2023, 3 pages.
Qu, B. et al., "Droplet Electroporation in Microfluidics for Efficient Cell Transformation with or without Cell Wall Removal," Lab Chip (2012) 12:4483-4488.
Saint Gobain (2017). "Pure-Fit® SC—Secure aseptic connections," Brochure, 5 total pages.
Sartorius Stedim Biotech (2011). "Opta® SFT," 4 total pages.
Schwartz C., "Optimizing Cell Separation with Beckman Coulter's Centrifugal Elutriation System," Beckmann Coulter Life Sciences (2014) 6 total pages.
SeriesLock™ (2021). Features and Specifications, located at https://serieslock.com/, 5 total pages.
Shi, Y. et al. (1992). "Performance of Mammalian Cell Culture Bioreactor with a New Impeller Design," Biotechnology and Bioengineering 40:260-270.
Steris (2018). "A compilation of material compatibilities with vaporized hydrogen peroxide," 2 total pages.
Steris (2018). "Sterility assurance levels (SALS): Irradiation," 3 total pages.
Steris (2020). "Overview of sterilization technology comparison," 1 total page.
Strahlendorf, K.A. et al. (2009). "Bio Pharm International—A review of sterile connectors," vol. 2009 Supplement, Issue 8, located at https://www.biopharminternational.com/view/review-sterile-connectors, 9 total pages.
U.S. Appl. No. 18/807,699, filed Aug. 16, 2024, by Beban et al.
U.S. Appl. No. 29/898,923, filed Aug. 2, 2023, by Gerlinghaus et al.
Written Opinion of the International Searching Authority mailed on Oct. 13, 2021, for PCT Application No. PCT/US2021/021773, filed on Mar. 10, 2021, 20 pages.
Final Office Action for U.S. Appl. No. 18/244,051 mailed Apr. 4, 2025, 11 pages.
Final Office Action for U.S. Appl. No. 18/988,628 mailed Jun. 12, 2025, 16 pages.
International Search Report and Written Opinion for PCT Application No. PCT/US2024/020809 mailed Mar. 24, 2025, 19 pages.
Non-Final Office Action for U.S. Appl. No. 18/807,699 mailed Apr. 29, 2025, 19 pages.
Notice of Allowance for U.S. Appl. No. 17/331,554 mailed Apr. 10, 2025, 6 pages.
Notice of Allowance for U.S. Appl. No. 18/487,884 mailed on Apr. 3, 2025, 8 pages.
Notice of Allowance for U.S. Appl. No. 18/652,602 mailed May 2, 2025, 14 pages.
Notice of Allowance for U.S. Appl. No. 18/799,963 mailed Jul. 1, 2025, 7 pages.
Notice of Allowance for U.S. Appl. No. 18/810,388 mailed Apr. 30, 2025, 5 pages.

* cited by examiner

BIOREACTORS AND METHODS OF THEIR USE IN AUTOMATIC CELL PROCESSING SYSTEMS

CROSS REFERENCE TO RELATED APPLICATIONS

This application claims priority to U.S. Provisional Patent Application Ser. No. 63/520,858 filed Aug. 21, 2023, the content of which is incorporated herein by reference in its entirety for all purposes.

TECHNICAL FIELD

The present disclosure relates to improved bioreactor systems, such as, for example, bioreactors for use in automatic cell processing systems.

BACKGROUND

Cell therapies involve collecting cells from an individual, processing the cells, and utilizing the processed cells to achieve a clinical response in the same or a different individual. Cell processing is a complex workflow that involves multiple steps, where each step typically requires a separate cell processing device and/or system to accomplish the specific step. Performing separate steps in separate cell processing devices adds operational complexity, increases spatial requirements to house the separate cell processing devices, and typically requires manual labor. That is, the separate cell processing devices makes it difficult to effectively manage the various workflow complexities, such as one step taking longer than another step, or the requirement that one step be completed before another step. Additionally, the space required to house the separate cell processing devices required to perform the steps may be significant. These workflow complexities and housing requirements may be compounded when performing cell processing at a high volume. Additionally, the environmental conditions of each cell processing device are generally difficult to control, which becomes increasingly burdensome as the number of cell processing devices increases. Accordingly, improved bioreactors, for example, bioreactors for use in automatic cell processing, are desirable.

SUMMARY

The present disclosure relates generally to systems, devices, and methods for cell processing within a bioreactor, for example, a bioreactor for use in an automated cell processing system. In general, an automated cell processing system may include a cartridge having a bioreactor module. The bioreactor module may include a bioreactor, a first thermal compartment positioned adjacent the bioreactor, and a second thermal compartment positioned adjacent the bioreactor. The cartridge may further include a fluidic manifold coupling the first and second thermal compartments to the bioreactor for helping to transfer fluid between and among various components of the bioreactor and other cell processing modules. The bioreactor may include one or more of an impeller for helping to stir cells and reagents, an air permeable liner, a sampling straw for removing cells from the bioreactor for sampling, and a perfusion filter for retaining cells while exchanging fluid.

The first thermal compartment and the second thermal compartment, which may be configured to maintain a fluid in a stable environment, may interlock with one another. The first thermal compartment and the second thermal compartment may be configured to hold volumes of the same or different amounts. In some variations, the first and second thermal compartments are configured to hold volumes of different amounts. For example, in some variations, the first thermal compartment may be configured to hold a volume of about 600 mL and the second thermal compartment may be configured to hold a volume of about 100 mL.

In some variations, the bioreactor module may further include a mixing chamber configured to receive one or more cell processing reagents. The mixing chamber may include an impeller for helping to stir cells and reagents. In some variations, the impeller of the mixing chamber and the impeller of the bioreactor may be coupled together. One or more of the bioreactor, the first thermal compartment, the second thermal compartment, and the mixing chamber may have a window for optical detection for viewing the progress of the cell processing, for example. One or more of the bioreactor, first thermal compartment, second thermal compartment, and the mixing chamber may be fluidically connected, for example via the fluidic manifold.

In some variations, the cartridge may further include a third thermal compartment positioned adjacent the bioreactor, where the third thermal compartment may be configured to maintain a fluid in a stable environment. The third thermal compartment may be configured to hold the same amount as the first and/or second thermal compartments. In some variations, the third thermal compartment is configured to hold a volume of about 600 mL. The third thermal compartment may have a window configured for optical detection. The cartridge may further include a second bioreactor module. The bioreactor modules may be thermally coupled to one another and/or other components of the bioreactor.

Also described herein are methods directed to automatically processing cells, for example, using a bioreactor to grow or culture cells. A method for cell processing may include providing cellular material to a cartridge having a bioreactor module comprising a bioreactor, a first thermal compartment positioned adjacent the bioreactor, and a second thermal compartment positioned adjacent the bioreactor. The method may further include transferring the cellular material to the bioreactor from either the first thermal compartment or the second thermal compartment and culturing cells in the bioreactor. The cells may be cultured for any amount of time as desirable. In some variations, the cells are cultured, such as by one or more cell processing steps, for about 12 hours to about 15 days. The bioreactor may be configured to perform one or more of a static process, a stirring process, and a perfusion process. The static process may maintain the cells in an unagitated state, which may facilitate cell growth and/or division. The stirring process may agitate the cells, which may facilitate homogeneity within the cellular material and/or cell division. The perfusion process may exchange at least a portion of the cellular material, such as media thereof. The perfusion process may remove and replace the portion of cellular material.

The method may further include measuring one or more of a pH value and a dissolved oxygen value of the cellular material in the bioreactor, sampling the cellular material using a sampling straw of the bioreactor, and/or measuring one or more of a lactate value and a glucose value of the sample of the cellular material.

In some variations, the bioreactor module may further include a mixing chamber. The method may further include performing one or more of transduction and transfection in the mixing chamber and/or transferring the cellular material to the mixing chamber from either of the first thermal compartment and the second thermal compartment.

In further variations, the cartridge may further include a second bioreactor module. In variations where the cartridge includes a second bioreactor module, the methods described herein, may also include performing independent cell processing steps in each of the bioreactor modules.

Additional embodiments, features, and advantages of the invention will be apparent from the following detailed description and through practice of the invention.

DETAILED DESCRIPTION

Figure 1A:
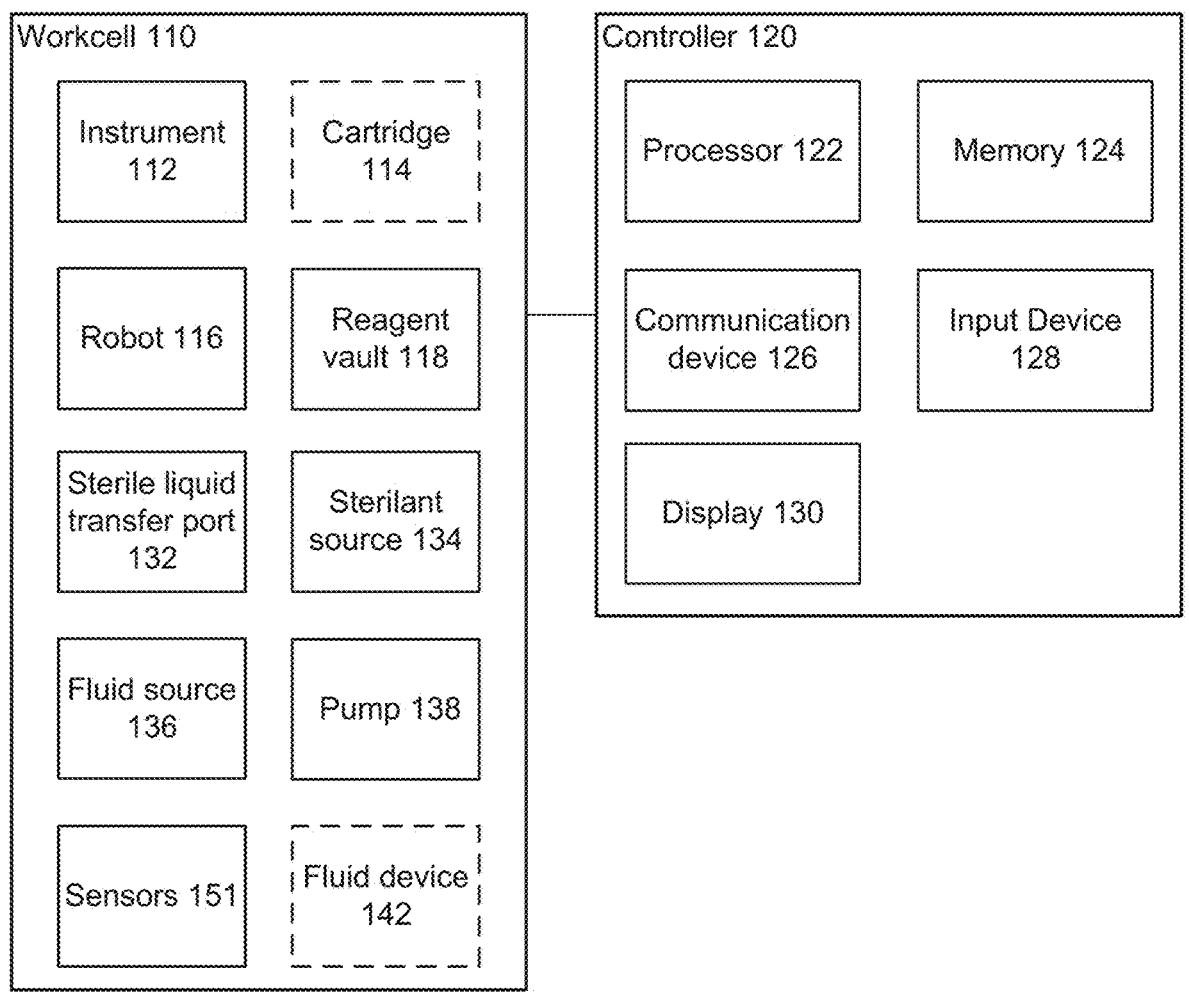
FIG. 1A is a block diagram of an illustrative variation of a cell processing system.

Disclosed herein are devices, systems, and methods for processing cells. Multiple cell processes, or cell processing steps, may be performed on cells within a cartridge, within a cell processing workcell. The cell processing workcell may be any suitable workcell. For example, the cell processing workcells described herein may comprise a plurality of bays, each bay having an instrument that when coupled to a corresponding module within a cartridge performs a cell processing step that corresponds to that module. For example, the cartridges described herein throughout comprise a bioreactor module. The bioreactor module of the cartridge, when coupled to the bioreactor instrument of the workcell, may be configured to perform a cell processing step, such as cell culturing. For example, a fluid (e.g., a cell solution comprising one or more of cells, reagents, buffer, and media) may be provided to the bioreactor module, which may comprise one or more of a bioreactor, a mixing chamber, and one or more additional thermal compartments. The bioreactor module may provide an environment suitable for cell growth and/or division. That is, the bioreactor module may comprise a thermally stable environment to help facilitate cell culturing by avoiding changes in temperature of the fluid as the fluid may be transferred throughout the bioreactor module that could otherwise interrupt or slow down the cell culturing process. The thermally stable environment may be facilitated by a heat exchanger. For example, the heat exchanger of the bioreactor module may be thermally coupled to one or more of the bioreactor, thermal compartments, and mixing chamber. Each of the of the bioreactor, thermal compartments, and mixing chamber may be thermally coupled, such that the thermal environment may be stable (e.g., substantially equal) throughout the bioreactor module.

The bioreactor module may be configured to perform one or more processes to the fluid within the bioreactor of the bioreactor module. For example, the one or more processes may include a static process, a stirring process, and a perfusion process. In some variations, the static process may maintain an unagitated fluid, such that cells therein may be undisturbed while undergoing cell growth (e.g., cell respiration) and/or division. Cells may consume oxygen ($O_2$) during cell growth and/or division whereas a byproduct of cell growth and/or division may be carbon dioxide ($CO_2$). A relatively small concentration (e.g., about 0% to 10% by volume) of carbon dioxide in the cell solution and/or in gaseous environment surrounding the cell solution (e.g., in a head space above the cell solution) may be useful in maintaining a stable pH within a target range (e.g., about 7 to about 7.4), as cell growth and/or division may be inhibited by volatile pH values and/or pH values outside of the target range. For example, the carbon dioxide may react with water to form carbonic acid which, in turn, may form bicarbonate ions and hydrogen ions, the latter of which may determine the pH of the cell solution. However, higher concentrations of carbon dioxide may asphyxiate cells in the cell solution by displacing the oxygen in the cell solution and/or may form so many hydrogen ions that the pH may decrease below the target range. Therefore, maintaining an appropriate balance of oxygen and carbon dioxide may be crucial to cell growth and/or division. Accordingly, the balance of oxygen and carbon dioxide may be adjusted by the stirring process. That is, the stirring process may agitate the fluid (e.g., with an impeller) which may mix the fluid to facilitate homogeneity therein. A homogeneous fluid (e.g., evenly distributed components) may facilitate equal exposure of cells to oxygen dissolved within the cell solution or one or more reagents, and/or may mitigate local concentrations of carbon dioxide. Furthermore, as cells within the cell solution continue to grow and/or divide, the resulting increase in cell size and/or cell count may lead to an increase in oxygen consumption and/or production of carbon dioxide. In turn, the availability of oxygen and/or the pH of the cell solution may decrease. Accordingly, the perfusion process may be used to remove a portion of the fluid (e.g., spent media) and replace the removed portion with new fluid (e.g., fresh media). The perfusion process may reestablish the dissolved oxygen and/or pH of the fluid to within the target range. The static, stirring, and/or perfusion processes may be performed in a single bioreactor, which may streamline the cell processing methods described herein by avoiding fluid transfers to one or more separate modules. Additionally, the static, stirring, and/or perfusion processes may be performed according to a pre-determined workflow. The pre-determined workflow may be programmed into a controller within a workcell.

1. Cell Processing System

The cell processing systems described herein may be configured to perform one or more cell processing steps in a workcell. The workcell may comprise a closed, automated environment, which may be configured to maintain a sterile environment. The workcell may receive a cartridge and perform one or more cell processing steps on cells in a cell solution (e.g., cell suspension) contained within the cartridge. For example, the cell processing system may comprise a workcell comprising a plurality of bays having instruments therein, each instrument configured to independently perform one or more cell processing steps when coupled to a corresponding module within the cartridge, and a robot capable of moving the cartridge within the workcell (e.g., between one or more bays). The robot and/or instruments may be configured to automatically operate such that operator assistance may not be required at any point during the workflow. For example, the robot may receive the cartridge and move the cartridge between locations (e.g., instruments, bays, storage vaults, feedthroughs) within the workcell according to a pre-programmed workflow, where each location may be associated with one or more cell processing steps. After performing one or more cell processing steps of the pre-programmed workflow; the workcell may be configured to transfer the cartridge out of the workcell (e.g., via the robot). Additionally, or alternatively, at least a portion of the cell solution may be transferred (e.g., via a fluid device or a fluidic manifold) to a second cartridge.

The cell solution (e.g., cell suspension) described herein may contain cells that may be processed for subsequent use in cell therapies. The cell solution may comprise cells (e.g., allogeneic cells) in a fluid, such as a media (e.g., cell culture media). The cell solution may contain cells from the same or different donors. Cells from the same donor may be split between one or more cartridges, such that separate cell processing steps may be performed on each of the cartridges and increase the overall throughput of the cell processing system described herein. The cell solution may be transferred to the cartridge prior to loading the cartridge into the workcell, such as by operating personnel. In some variations, the cartridge may be empty when loaded into the workcell such that the workcell may transfer a cell solution to the cartridge. In some variations, the cells from two or more cartridges may be combined according to a pre-determined ratio, which may correspond to an intended therapeutic treatment for a patient.

An illustrative cell processing system for use with the automated devices, systems, and methods is shown in FIG. 1A. Shown there is a block diagram of a cell processing system 100 comprising a workcell 110 and controller 120. The workcell 110 may comprise one or more of an instrument 112, a robot 116 (e.g., robotic arm), a reagent vault 118, a sterile liquid transfer port 132, a sterilant source 129, a fluid source 136, a pump 138, and a sensor(s) 151. A cartridge 114 and a fluid device 142, which may be provided outside of the workcell 110 and used within the workcell 110, are illustrated in dashed lines. In some variations, the fluid device 142 may be a sterile liquid transfer device (SLTD). However, it should be appreciated that the fluid device 142 may be configured to transfer any fluid (which includes liquids), whether sterile or not. The controller 120 may comprise one or more of a processor 122, a memory 124, a communication device 126, an input device 128, and a display 130.

The workcell 110 may comprise a fully, or at least partially, enclosed housing inside which one or more cell processing steps may be performed in a fully, or at least partially, automated process. The cartridge 114 may be moved using the robot 116 to reduce manual labor in the cell processing steps, and fluid transfers into and out of the cartridge 114 may also be performed in a fully or partially automated process, as will be described in detail herein. For example, one or more fluids may be stored in a fluid device 142, such that the one or more fluids may be transferred to the cartridge 114 and/or removed from the cartridge 114 via the fluid device 142. In some variations, the fluid device 114 may be moved within the system 100 by the robot 116. Accordingly, the workcell 110 described herein advantageously enables the transfer of fluids in an automated and metered manner for automating cell therapy manufacturing.

The workcell 110 may facilitate fluid transfers and/or cartridge transfers. For example, in some variations, the robot 116 may be configured to move more than one cartridge 114 between different bays to perform a predetermined sequence of cell processing steps (e.g., workflow). In this way, multiple cartridges 114 may be processed in parallel, as different steps of the cell processing workflow may be performed at the same time on different cartridges. In another example, a sterile liquid transfer port 132 may be coupled between two or more cartridges 114 to transfer a cell product and/or other fluid between the cartridges 114. Furthermore, the sterile liquid transfer port 132 may be coupled between any set of fluid-carrying components of the system 100 (e.g., cartridge 114, reagent vault 118, fluid source 136, fluid device 142, etc.). For example, a first sterile liquid transfer port may be coupled between a first cartridge and a corresponding sterile liquid transfer port of a fluid device.

Other suitable cell processing systems and aspects thereof are provided in, e.g., U.S. patent application Ser. No. 17/198,134, published as U.S. Patent Publication No. 2021/0283565, U.S. patent application Ser. No. 18/731,095, U.S. patent application Ser. No. 18/759,602, and U.S. patent application Ser. No. 18/807,699, the content of each of which is incorporated in its entirety by reference herein.

A. Cartridge

The cell processing systems described herein may comprise one or more cartridges having one or more modules configured to interface with, or releasably couple to, one or more instruments within the workcell. Some or all of the modules may be integrated in a fixed configuration within the cartridge, though they need not be. Indeed, one or more of the modules may be configurable or moveable within the cartridge, permitting various formats of cartridges to be assembled. For example, the cartridge may be a single, closed unit with fixed components for each module, or the cartridge may contain configurable modules coupled by configurable fluidic, mechanical, optical, and electrical connections. In some variations, one or more sub-cartridges, each containing a set of modules, may be used to perform various cell processing workflows. The modules may each be provided in a distinct housing or may be integrated into a cartridge or sub-cartridge with other modules. The disclosure generally shows modules as distinct groups of components for the sake of simplicity, but it should be noted that these modules may be arranged in any suitable configuration. For example, the components for different modules may be interspersed with each other such that each module may be defined by the set of connected components that collectively perform a predetermined function. However, the components of each module may or may not be physically grouped within the cartridge. In some embodiments, multiple cartridges may be used to process a single cell product through transfer of the cell product from one cartridge to another cartridge of the same or different type and/or by splitting cell product into more cartridges and/or pooling multiple cell products into fewer cartridges.

Generally, each of the instruments within the workcell interfaces with, or is releasably coupled to, its respective module or modules on the cartridge in order to carry out a specific cell processing step. For example, when a cartridge has a cell sorting module, it may be moved by the robot to a bay within the workcell having a cell sorting instrument so that the cell sorting module may be coupled to the cell sorting instrument in order to sort the cells within the cartridge. One advantage of such split module/instrument designs is that expensive components (e.g., motors, sensors, heaters, lasers, etc.) may be retained in the instruments of the system while less expensive components may reside in the cartridge.

Figure 1B:
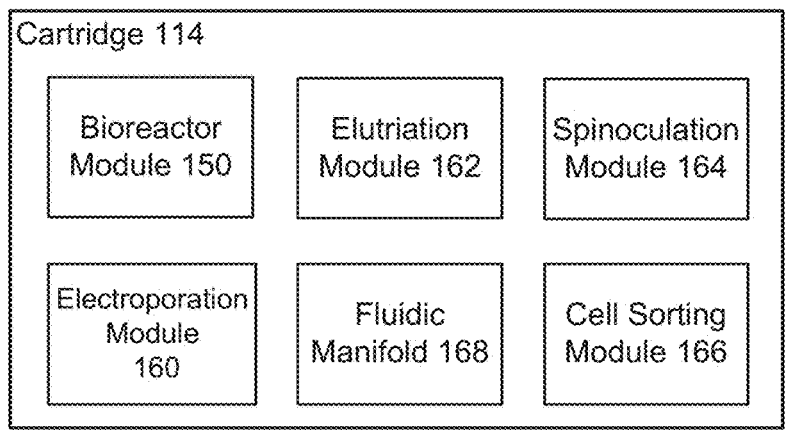
FIG. 1B is a block diagram of a cartridge that may be used with the cell processing system of FIG. 1A.

As illustrated in FIG. 1B, the cartridge 114 may be configured to contain (e.g., house) a cell solution (e.g., cell suspension) for cell processing. Any number of cell processing steps may take place upon the cells within the cartridge. Accordingly, the cartridge 114 may comprise one or more of a bioreactor 150, an electroporation module 160, an elutriation module 162, a spinoculation module 164, a cell sorting module 166, and a fluidic manifold 168. In instances where cell sorting is to be performed, specific reagents (e.g., magnetic particles) may be added to a cell solution within one or more of the cartridge molecules. The magnetic particles are configured to couple to cells of a specific type (e.g., targeted cells) as described above. The elutriation module 162 may be configured to perform an elutriation process, wherein cellular material may be separated according to size, shape, and/or density. The spinoculation module 164 may be configured to perform a spinoculation process, wherein cells of different types may be bound together.

The fluidic manifold 168 may be configured to transfer one or more fluids between one or more modules of the cartridge 114. For example, the fluidic manifold 168 may transfer a cell solution from the bioreactor module 150 to the cell sorting module 166. The cell solution may include cellular material, including targeted cells coupled to magnetic particles. In another example, the fluidic manifold 168 may transfer a cell solution from the cell sorting module 166 to any other module 114, such as after a cell sorting process has been performed. The fluidic manifold 168 may be configured to transfer the sorted cells (e.g., targeted cells) to one module and non-targeted material to a different module.

Other suitable cartridges and cell processing modules that may be used with the automatic cell processing work cells described herein are provided in, e.g., U.S. patent application Ser. No. 18/652,602, U.S. patent application Ser. No. 18/532,621, U.S. patent application Ser. No. 18/620,826, and U.S. patent application Ser. No. 18/611,632, the content of each of which is incorporated in its entirety by reference herein.

Figure 2B:
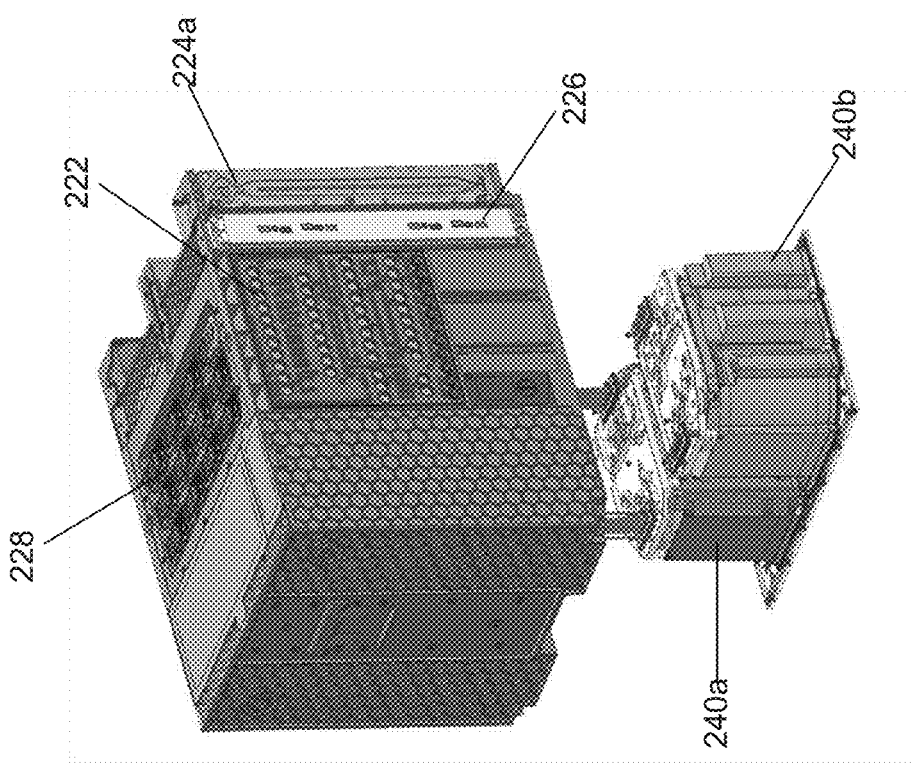
FIG. 2B is a rear perspective view of the cartridge of FIG. 2A.
Figure 2A:
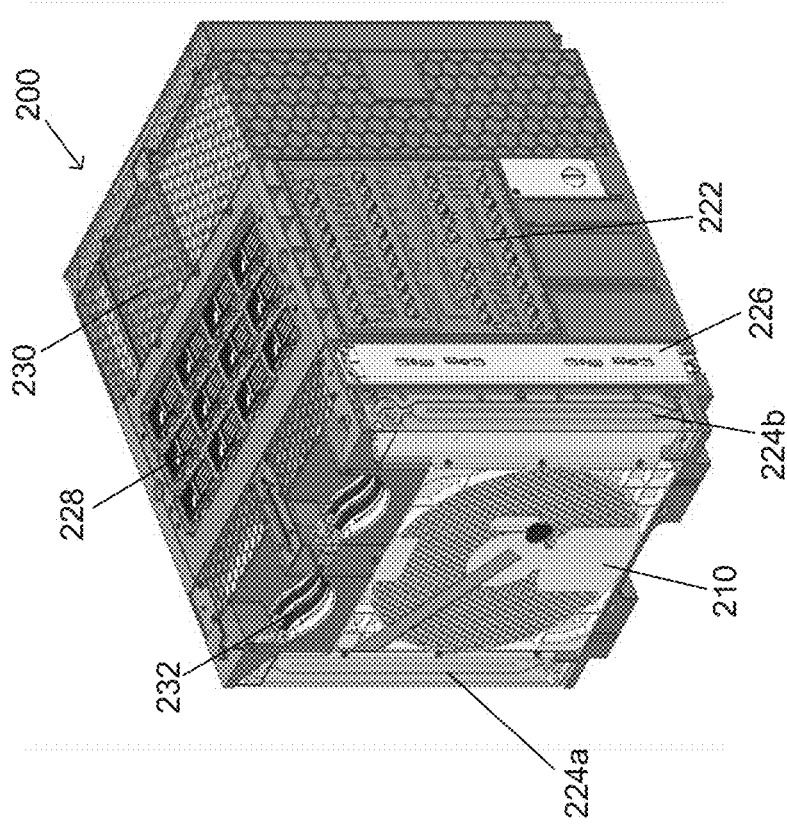
FIG. 2A is a front perspective view of a cartridge that may be provided to a cell processing system.

Referring to FIGS. 2A and 2B, an illustrative variation of a cartridge 200 is shown. The cartridge 200 may comprise an elutriation module 210, a fluidic manifold 222, a first cell sorting module 224a, a second cell sorting module 224b, an auxiliary module 226, a fluid device tray 228, a liquid container 230, a pump module 232, a first bioreactor module 240a, and a second bioreactor module 240b. While shown in these figures as having two cell bioreactor modules, it should be understood that any number of bioreactor modules may be used as desirable. For example, the cartridge may contain 1, 2, 3, 4, or even more bioreactor modules depending on the size of the cartridge, the existence of other cell processing modules within the cartridge, and so on. The bioreactor modules 240a. 240b may perform a cell culturing process, as will be described in further detail below: The electroporation module 220 may be configured to facilitate intracellular delivery of macromolecules (i.e., transfection by electroporation). An electrical discharge from one or more capacitors, or current sources, may generate sufficient current in the chamber to promote transfer of a polynucleotide, protein, nucleoprotein complex, or other macromolecule into the cells in the cell product. The fluidic manifold 222 may comprise at least one fluid conduit. The at least one fluid conduit of the fluidic manifold 222 may be configured to allow fluid to pass therethrough. For example, the at least one fluid may be a liquid or a gas. In some variations, the at least one fluid may comprise a solution of cells of varying sizes and densities. The fluidic manifold 222 may comprise at least one fluid inlet and at least one fluid outlet, and may comprise at least one valve. The fluidic manifold 222 may be fluidically connected to at least one module within the cartridge 200. For example, the fluidic manifold 222 may be configured to transfer at least one fluid to the first and/or second bioreactor modules 240a. 240b. The fluidic manifold 222 may be in communication with a controller, such as the controller 120 described in reference to FIG. 1A. For example, at least one valve of the fluidic manifold 222 may open and/or close in response to a command sent by the controller 120 to transfer fluid between various modules of the cartridge in accordance with a predetermined workflow.

The fluid transfer port tray 228 may comprise one or more ports configured to transfer fluid to or from one or more fluid devices. That is, each port of the fluid transfer port tray 228 may be configured to facilitate a sterile liquid transfer. In some variations, each port may be fluidically connected to a fluidic conduit configured to fluidically connect with at least one module of the cartridge 114. For example, each port of the fluid transfer port tray 228 may be fluidically connected to the fluidic manifold 222. In this way, a fluid may flow from a fluid device coupled to a port of the fluid transfer port tray 228 to the fluidic manifold 222, or vice versa. In some variations, each port of the fluid transfer port tray 228 may be fluidically connected to the liquid storage container 230. The liquid storage container 230 may be configured to contain a fluid. In some variations, the fluid may be a liquid or a gas. In some variations, the liquid storage container 230 comprises a plurality of liquid containers. For example, the liquid storage container 230 may comprise one container, two containers, or three containers. The liquid storage container 230) may be fluidically connected to at least one module of the cartridge 200. In some variations, the liquid container 230 may be fluidically connected to the fluidic manifold 222. Accordingly, a fluid may flow between a port of the fluid transfer port tray 228, the fluidic manifold 222, and the liquid storage container 230).

The cartridge may further comprise a pump module 232 having a pump configured to pump fluid in one or more directions along at least one fluid path. For example, the pump module 232 may be configured to pump a fluid to or from one or more of the elutriation module 210, the fluidic manifold 222, the cell sorting modules 224a. 224b, the auxiliary module 226, the fluid transfer port tray 228, the liquid container 230, and any other module within the cartridge. The auxiliary module 226 may be configured to engage with at least one instrument and/or module. The auxiliary module 226 may comprise at least one electrical connector and/or at least one fluidic connector. In some variations, the auxiliary module 226 may be removed and replaced by any other module.

Various materials may be used to construct the cartridge (including the modules thereof) and the cartridge housing, including metal, plastic, rubber, and/or glass, or combinations thereof. The cartridge, its components, and its housing may be molded, machined, extruded, 3D printed, or any combination thereof. The cartridge may contain components that are commercially available (e.g., tubing, valves, fittings). The commercially available components may be attached or integrated with custom components or devices. The housing of the cartridge may constitute an additional layer of enclosure that further protects the sterility of the cell product.

i. Bioreactor Module

The cartridges described herein may include one or more bioreactor module. The bioreactor module may comprise one or more of a bioreactor, a mixing chamber, and a thermal compartment. Each of the bioreactor, mixing chamber, and thermal compartment may be configured to contain a fluid. The one or more components of the bioreactor module may be fluidically connected, such that a fluid may be transferred between one or more of the bioreactor, mixing chamber, and thermal compartment. The bioreactor module may provide an environment suitable for cell culturing. For example, the bioreactor module may maintain a thermally stable environment using a heat exchanger. That is, one or more of the bioreactor, mixing chamber, and thermal compartment may be thermally coupled such that the heat exchanger may maintain a stable temperature throughout the bioreactor module. In another example, the bioreactor module may provide a pre-determined mixture of gases. The pre-determined mixture of gases (e.g., carbon dioxide, oxygen, and/or nitrogen) may facilitate cell culturing by providing one or more nutrients that may be useful for the cell culturing process. For example, oxygen and/or nitrogen may be consumed by cells during cell growth and/or division. In another example, carbon dioxide may be useful in maintaining a pH of the fluid within a target range.

In some variations, it may be desirable for the cartridge to have two or more bioreactor modules. The two or more bioreactor modules may have the same or different configuration. For example, to increase the range of working volumes of the cartridge, the cartridge may have two bioreactor modules with bioreactors each configured to contain a different volume of fluid. In some variations, a second bioreactor of a second bioreactor module may have an internal volume two or more, five or more, or ten or more times larger than the internal volume of a first bioreactor of a first bioreactor module. In some embodiments, the cartridge achieves a wide range of working volumes (e.g., from about 5 mL to about 1,000 mL or more) by having two, three, four, five or more bioreactor modules of the same or different sizes connected to the same fluidic manifold or several fluidic manifolds.

The bioreactor module may perform one or more cell processing steps associated with cell culturing. For example, the bioreactor module may be configured to perform one or more of an expansion step, a sorting step, a transduction step, a transfection step, a perfusion step, a depletion step, and a seeding step as described in further detail below. Cell culturing, which may be facilitated by performing one or more the cell processing steps described herein, may occur for a pre-determined period according to a pre-determined workflow. In some variations, the pre-determined period may be between about 6 hours and about 20 days, about 12 hours to about 15 days, or about 1 day to about 12 days, including 12 hours. 3 days. 6 days. 9 days. 12 days, or 15 days. One or more cell processing steps may be repeated throughout the pre-determined period. Any suitable cells may be processed with the systems described herein throughout, including various immune and non-immune cells such as, T cells, hematopoietic stem cells (HSCs), hematopoietic stem and progenitor cells (HSPCs), natural killer cells (NK), B cells, pre-B cells, lymphocytes. 293 cells, HEK cells, CHO cells, bacterial cells, yeast cells, and others.

In an expansion step, the number of cells within a cell solution may be increased. For example, the bioreactor may comprise an impeller configured to mix the cell solution contained therein. The rate of rotation of the impeller may be adjusted to increase or decrease the efficacy of the mixing. For example, increasing the rate of rotation may correspond to a greater increase in the number of cells. Conversely, decreasing the rate of rotation may correspond to a lower increase in the number of cells. Cell expansion may be performed for a pre-determined duration, which may correspond to a target cell count. For example, a relatively low target cell count may correspond to a relatively short pre-determined duration (e.g., about 30 minutes up to about 72 hours), and a relatively high target cell count may correspond to a relatively long pre-determined duration (e.g., about 72 hours to about 14 days). The bioreactor instrument may provide closed loop control of temperature, dissolved oxygen, and/or acidity (pH) to the bioreactor to permit growth of the cells intended for culturing (e.g., white blood cells). Optionally, one or more reagents may be introduced to the bioreactor, for example, cell-type specific activating reagents.

In a sorting step, cells intended for further processing (e.g., targeted cells) may facilitate cell selection by binding one or more reagents to the targeted cells. In an exemplary variation, a cell solution may be contained within a mixing chamber of the bioreactor module, such that one or more reagents may be transferred thereto. The reagent may be transferred to the mixing chamber via, for example, a fluid device and a robot. The reagent may be configured to attach to certain cell types, such as CD4+ and/or CD8+ cells, according to the pre-programmed workflow. The reagent may comprise magnetic particles. Accordingly, the cell solution may be transferred to a cell sorting module, such that the targeted cells may be sorted by applying a magnetic array proximate a flow cell of the cell sorting module as the cell solution flows through the flow cell.

In a transduction step, a transduction reagent (e.g., a lentiviral vector and/or a virus) may be introduced to a cell solution within the bioreactor module. The transduction reagent may be configured to target a specific cell type. Accordingly, the quantity (e.g., volume) of the transduction reagent may correspond to a cell concentration value (e.g., number of cells per unit volume) within the cell solution. For example, a relatively large quantity of the transduction reagent may be introduced to a cell solution with a relatively high cell concentration value, and a relatively small quantity of the transduction reagent may be introduced to a cell solution with a relatively low cell concentration value. In this way, the quantity of transduction reagents may be approximately proportional to the concentration of target cells in the cell solution. The transduction reagent may be used to introduce, for example, a chimeric antigen receptor (CAR) to cells within the cell solution. In another example, a lentiviral vector comprising Lenti-CD19 CAR (scFv-41BB-CD3ζ, CTL019) may be configured to target CD19+ cells. In some variations, a robot may move the cartridge to a sterile liquid transfer instrument of the workcell. The sterile liquid transfer instrument may convey the cell solution to the bioreactor module and an additional solution containing a viral or non-viral vector. Optionally, the vector solution may be stored frozen (e.g. at −80° C.) and thawed and/or warmed shortly before being conveyed to the bioreactor module. Cells culturing in the presence of the viral or non-viral vector may result in transduction of the cells by the viral or non-viral vector.

In a transfection step, a transfection reagent (e.g., a nucleic acid) may be introduced to a cell solution by a nonviral method. Transfection may be configured to knockout certain cell types that may be associated with eliciting immune responses (e.g., graft vs host disease) in subsequent patients. That is, transfection may decrease the likelihood that a cell therapy recipient rejects the cells developed by the cell processing described herein. Transfection may be performed by adding one more transfection reagents to the bioreactor module containing the cell solution, such that the cells may be modified by the transfection reagents. The transfection reagent may comprise a liquid nanoparticle (LNP).

In a perfusion step, a pre-determined volume of media within the cell solution contained within the bioreactor of the bioreactor module may be replaced. Perfusion may be useful in maintaining an amount of nutrients in the cell solution associated with a desired cell growth rate and/or maintain a suitable pH level. For example, cells may consume glucose and/or oxygen dissolved in the cell solution during the cell growth process, so a low level of glucose and/or dissolved oxygen may reduce or prevent cell growth. Conversely, cells may expel (e.g., excrete) lactate and/or carbon dioxide during the cell growth process, so an excess of lactate and/or carbon dioxide may inhibit cell growth by displacing glucose and/or dissolved oxygen. Accordingly, the perfusion process may ensure the amount of glucose and/or dissolved oxygen within the cell solution remains above a level sufficient to support the desired cell growth and/or the amount of lactate and/or carbon dioxide within the cell solution remains below a level sufficient to prevent inhibiting cell growth. In addition, in some variations, the cell culturing process may be optimally performed within a target pH range. For example, the target pH range may be between about 7 and about 7.6, about 7.1 and about 7.5, or about 7.2 and about 7.4. In some variations, the target pH may about 7, about 7.1, about 7.2, about 7.3, about 7.4, about 7.5, or about 7.6. The cell growth and/or division processes may result in carbon dioxide, which may form bicarbonate ions and hydrogen ions. The latter of which may decrease the pH of the cell solution. Accordingly, perfusion may remove a volume of the cell solution such that new cell solution may be added without overfilling the bioreactor module. In some variations, perfusion may be performed continuously such that a volume of media may be constantly being removed and new (e.g., fresh) media may be constantly being added. Cells within the cell solution may be retained within the bioreactor (e.g., via a filter), such that only the media may be exchanged. In some variations, the pre-determined volume of media exchanged (e.g., removed and replaced) may be about 10% to about 100%, including about 25%, about 50%, and about 75% of the original cell solution. In some variations, perfusion may be performed within a first bioreactor module of the cartridge. In other variations, at least a portion of the cell solution may be transferred to a second bioreactor module, such that perfusion may be performed in the second bioreactor module.

In a depletion step, unmodified cells of the cell solution may be removed from the cell solution. Cell depletion may be configured to separate cells within a cell solution using one or more depletion reagents. For example, the depletion reagents (e.g., depletion microbeads) may be added to the cell solution, which may be stored in the bioreactor module, such that the cells may be incubated with the depletion reagents. That is, the depletion reagents may be configured to bind to certain cells (e.g., target cells), which may mark the non-bonded cells for subsequent removal. In an exemplary variation, the depletion reagents may bind to CD3+ cells (which may include CD4+ and CD8+ cells) such that the bounded CD3+ may be separated from unmodified T cells. Accordingly, the unmodified T cells may be removed from the cell solution.

In a seeding step, cells that have previously undergone one or more cell processing steps may be used to begin a new cell culturing process. For example, a portion of a cell solution from a first bioreactor module may be transferred to a second bioreactor module. The cell culturing process may be performed in the second bioreactor module. The seeding step may facilitate a faster and/or successful cell culturing process.

The bioreactor module described herein may be configured to facilitate one or more measurements. For example, one or more of the bioreactor, thermal compartments, and mixing chamber may have a window configured for optical detection. That is, a sensor may be operatively coupled to the one or more windows such that one or more parameters within the bioreactor module may be measured. Additionally or alternatively, the bioreactor module may comprise one or more fluid conduits configured to sample a portion of the fluid within the bioreactor module. For example, the cartridge may comprise one or more sensors configured to measure one or more of a lactate value and a glucose value of the sample. That is, the one or more sensors may comprise a glucose sensor and/or a lactate sensor. Advantageously, measuring one or more of a lactate value and a glucose value within the cartridge may increase the efficiency of the cell processing described herein by reducing the time and/or steps required to obtain a lactate and/or glucose measurements. That is, the sample may be measured within the cartridge and thus avoid additional steps associated with transferring the sample to an analytical instrument. In another example, the portion of the fluid within one or more of the bioreactor and mixing chamber may be removed via the fluid conduit and transferred to an analytical instrument. The analytical instrument may be within the workcell (e.g., an online instrument) or, in some variations, may be outside of the workcell (e.g., an offline instrument). The analytical instrument may be configured to measure one or more a lactate value and a glucose value of the sample. The flexibility provided by the analytical instrument may facilitate higher throughput by the bioreactor module described herein, as more than one measurement may be performed in parallel without interrupting the cell culturing process.

Figure 1C:
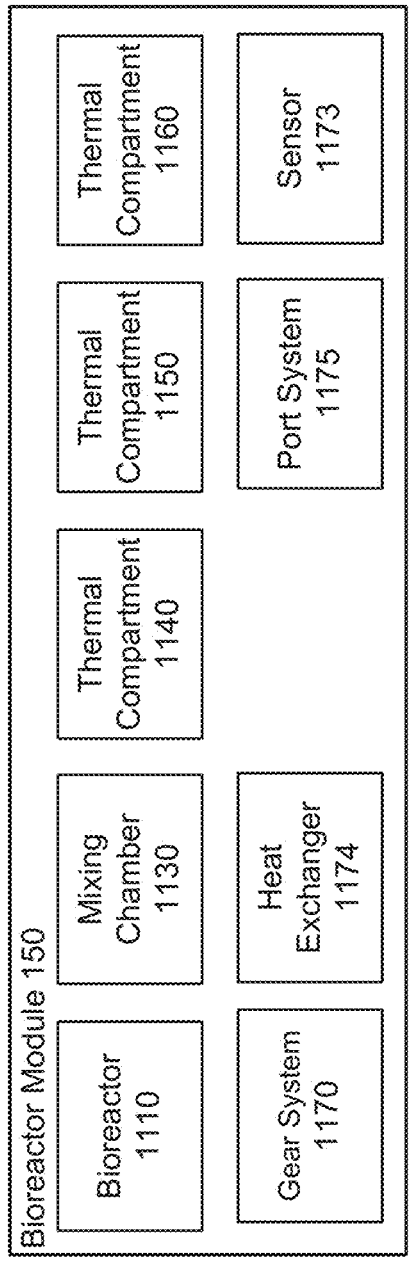
FIG. 1C is a block diagram of a bioreactor module of the cartridge of FIG. 1B.

Referring to FIG. 1C, a block diagram of an exemplary variation of the bioreactor module 150 is shown. The bioreactor module 150 may comprise a bioreactor 1110, a mixing chamber 1130, a first thermal compartment 1140, a second thermal compartment 1150, a third thermal compartment 1160, a gear system 1170, a sensor 1173, a heat exchanger 1174, and a port system 1175. The bioreactor 1110, mixing chamber 1130, first thermal compartment 1140, second thermal compartment 1150, and third thermal compartment 1160 may be fluidically and/or thermally connected. For example, a fluid may be transferred between one or more of the bioreactor 1110, mixing chamber 1130, first thermal compartment 1140, second thermal compartment 1150, and third thermal compartment 1160. In another example, a heat exchanger may be coupled to one or more the bioreactor 1110, mixing chamber 1130, first thermal compartment 1140, second thermal compartment 1150, and third thermal compartment 1160, such that a thermal environment may be maintained throughout the bioreactor module 150.

In some variations, the bioreactor 1110, mixing chamber 1130, first thermal compartment 1140, second thermal compartment 1150, and third thermal compartment 1160 may be positioned within the bioreactor module 150 in any configuration. For example, the first thermal compartment 1140 may be positioned adjacent the bioreactor and/or the second thermal compartment 1150 may be positioned adjacent the bioreactor. In some variations, the first thermal compartment 1140 and the second thermal compartment 1150 may interlock with one another. That is, the first thermal compartment 1140 and the second thermal compartment 1150 may have shapes that correspond to each other. For example, one or more sidewalls of the first thermal compartment 1140 may include one or more bends, and one or more sidewalls of the second thermal compartment 1150 may include one or more bends that mirror the one or more bends of the first thermal compartment 1140. In some variations, the first thermal compartment 1140) and the second thermal compartment 1150 may share a sidewall, such that fluid within the first thermal compartment 1140 may be on a first side of the shared sidewall and fluid the second thermal compartment 1150 may be on the second side of the shared sidewall. The configuration described herein may facilitate heat transfer, such that a thermal environment within the bioreactor module may be relatively even throughout. Maintaining a relatively even thermal environment may avoid issues associated with cells experiencing sudden changes in temperature, which may otherwise inhibit, slow down, or stop cell culturing and/or growth. That is, the cells should ideally be maintained at a constant temperature as the cells are transferred between the components of the bioreactor module.

The bioreactor 1110 may be configured to hold a volume of fluid and perform one or more processes to the fluid therein. For example, the bioreactor 1110 may be configured to perform one or more of a stirring process, static process, and perfusion processed as described herein. That is, the bioreactor 1110 may advantageously facilitate high-throughput cell processing by performing one or more processes within the bioreactor 1110 itself and thereby reducing or eliminating the need to transfer the fluid to another module. The one or more processes and/or fluid transfers in and/or out of the bioreactor 1110 may be performed in accordance with a pre-determined workflow. In some variations, the bioreactor 1110 may comprise one or more sidewalls that may be impermeable to liquid and/or gas. The bioreactor 1110 may be configured to hold a volume of fluid between about 5 mL to about 2 L, about 50 mL to about 800 mL, or about 100 mL to about 600 mL, including about 50 mL, about 100 mL, about 200 mL, about 300) mL, about 400) mL, about 500 mL, about 600 mL, about 700 mL, about 800 mL, about 900 mL, about 1 L, about 1.5 L, or about 2 L. The bioreactor 1110 may comprise a cross-sectional shape such as a circle, an oval, a rectangle, a triangle, or a combination thereof. The bioreactor 1110 will be described in further detail with reference to FIG. 1D.

The mixing chamber 1130 may be configured to hold a volume of fluid and perform one or more processes to the fluid therein. For example, the mixing chamber 1130 may be configured to perform a stirring process. That is, the mixing chamber 1130 may receive one or more reagents, which may be combined with a fluid using an impeller of the mixing chamber 1130. The impeller may rotate such that the one or more reagents may mix with (e.g., contact) target cells (e.g., cells intended for further processing and/or use in cell therapies). The resulting mixture may be transferred out of the mixing chamber 1130 to the bioreactor 1110, thermal compartments 1140, 1150, 1160, and/or another module of the cartridge 114. The fluid and/or reagent(s) may be transferred in and/or out of the mixing chamber 1130 in accordance with a pre-determined workflow: For example, the mixing chamber 1130 may comprise one or more sidewalls that may be impermeable to liquid and/or gas. The mixing chamber 1130 may be configured to hold a volume of fluid between about 5 mL to about 1 L, about 50 mL to about 800 mL, or about 100 mL to about 600 mL, including about 50 mL, about 100 mL, about 200 mL, about 300 mL, about 400 mL, about 500 mL, about 600 mL, about 700 mL, about 800 mL, about 900 mL, or about IL. The mixing chamber 1130 may comprise a cross-sectional shape such as a circle, an oval, a rectangle, a triangle, or a combination thereof. The mixing chamber 1130 will be described in further detail with reference to FIG. 1E.

The thermal compartments 1140, 1150, 1160 may each be configured to hold a volume of fluid in a stable environment. For example, one or more the thermal compartments 1140, 1150, 1160 may be thermally coupled to the bioreactor 1110 and/or mixing chamber 1130, such that there be thermal equilibrium therebetween. The thermally balanced configuration may facilitate cell culturing by mitigating issues associated with a cell solution experiencing changes in temperature. For example, cell growth and/or division may slow down or stop completely if the cell solution temperature drops below an intended value. In another example, one or more cell proteins may denature if the cell solution temperature increases above an intended value. Additionally or alternatively, the thermal compartments 1140, 1150, 1160 may maintain a stable gaseous environment therein. That is, one or more the thermal compartments 1140, 1150, 1160 may be fluidically connected to the port system 1175, which may be configured to provide oxygen, carbon dioxide, nitrogen, and/or sterile air as required to maintain the cell solution at a stable pH and with sufficient oxygen and/or nitrogen dissolved therein. Accordingly, the thermal compartments 1140, 1150, 1160 may be configured to facilitate cell culturing by maintaining a thermal and/or gaseous environment. In some variations, each of the thermal compartments 1140. 1150, 1160 may comprise one or more sidewalls that may be impermeable to liquid and/or gas. Each of the thermal compartments 1140, 1150, 1160 may be configured to hold a volume of fluid between about 5 mL to about 1 L, about 50 mL to about 800 mL, or about 100 mL to about 600 mL, including about 50 mL, about 100 mL, about 200 mL, about 300 mL, about 400 mL, about 500 mL, about 600 mL, about 700 mL, about 800 mL, about 900 mL, or about IL. In some variations, the thermal compartments 1140, 1150, 1160 may be configured to hold the same volume of fluid, but need not. For example, the first thermal compartment 1140 may be configured to hold a volume of about 600 mL, the second thermal compartment 1150 may be configured to hold a volume of about 100 mL, and the third thermal compartment 1160 may be configured to hold a volume of about 600 mL. The volume(s) may be determined by a pre-determined workflow. For example, after a cell sorting step, cellular material may be transferred to the second thermal compartment 1150. The relatively smaller volume of the second thermal compartment 1150 may correspond to the relatively small number of cells that may be obtained via the cell sorting step described previously. In another example, the 600 mL capacity of the first and third thermal compartments 1140, 1160 may be appropriate to house cellular material after performing an expansion step, which may correspond to a relatively high number of cells. The fluid may be transferred in and/or out of each of the thermal compartments 1140, 1150, 1160 in accordance with a pre-determined workflow. Each of the thermal compartments 1140, 1150, 1160 will be described in further detail with reference to FIGS. 1G-1I, respectively.

The heat exchanger 1174 may be configured to maintain a thermal environment within the bioreactor module 150. The heat exchanger 1174 may be thermally connected to one or more of the bioreactor 1110, mixing chamber 1130, first thermal compartment 1140, second thermal compartment 1150, and third thermal compartment 1160. For example, the heat exchanger 1174 may be configured to generate an amount of heat and/or remove an amount of heat from a component within the bioreactor module. The thermal connection may be facilitated by one or more thermal paths. The thermal path(s) may be defined by a thermal conduit and/or a thermal pad. The thermal paths (e.g., thermal conduits, thermal pads) may comprise a thermally conductive material. For example, the thermally conductive material may be a metal (e.g., copper, aluminum). In some variations, a thermal pad may be underneath one or more of the bioreactor 1110, mixing chamber 1130, first thermal compartment 1140, second thermal compartment 1150, and third thermal compartment 1160. The thermal pads may be substantially flat, such that the thermal pads may couple with a corresponding flat surface of the bioreactor 1110, mixing chamber 1130, first thermal compartment 1140, second thermal compartment 1150, and/or third thermal compartment 1160. A thermal conduit may connect one or more of the thermal pads underneath one or more of the bioreactor 1110, mixing chamber 1130, first thermal compartment 1140, second thermal compartment 1150, and third thermal compartment 1160. The heat exchanger 1174 may be controlled by a controller, such as the controller 120. For example, the controller 120 may control the amount of heat generated and/or removed by the heat exchanger 1174 by increasing and/or decreasing an electrical current provided to the heat exchanger 1174. Accordingly, the heat exchanger 1174 may control the thermal environment throughout the bioreactor module 150.

The sensor 1173 may be configured to measure one or more parameters of the bioreactor module 150. For example, the sensor 1173 may be operatively coupled to the bioreactor 1110, mixing chamber 1130, and/or thermal compartments 1140, 1150, 1160. The sensor 1173 may be configured to measure temperature, pressure, gas concentration, humidity, pH, fluid level, and/or dissolved oxygen. For example, the sensor 1173 may be operatively coupled to a window of the bioreactor 1110, such that the sensor 1173 may measure a pH and/or dissolved oxygen value of a fluid within the bioreactor 1110. In another example, the sensor 1173 may measure a gas concentration (e.g., unit of gas per unit of volume) of oxygen, nitrogen, and/or carbon dioxide within one or more bioreactor 1110, mixing chamber 1130, and/or thermal compartments 1140, 1150, 1160. The sensor 1173 may be in communication with a controller, such as the controller 120. Accordingly, the sensor 1173 may facilitate a closed-loop system by providing one or more measurements to the controller 120 which may, in response, adjust one or more parameters (e.g., temperature, gas concentration, fluid level) of the bioreactor 150.

The gear system 1170 may comprise one or more gears configured to rotate one or more components within the bioreactor module 150. For example, in some variations, one or more gears may be coupled to an impeller of the mixing chamber 1130 and/or bioreactor 1110. Advantageously, in some variations, the gear system 1170 may be optimized to facilitate motion of the impellers of both of the mixing chamber 1130 and bioreactor 1110. Accordingly, the impellers of the mixing chamber 1130 and bioreactor 1110 may share components, which may reduce the number of components of the bioreactor module 150 and/or operational complexity thereof. For example, a first gear (e.g., a drive gear) may be coupled to each of a second gear (e.g., a first driven gear) and a third gear (e.g., a second driven gear). The first gear may receive an input, such that the first gear may rotate in response to the input. For example, the input may be provided via one or more electromagnets coupled to the first gear, such that providing a current to the electromagnet(s) may rotate the first gear. In another example, the input may be provided via a motor be coupled to the first gear such that actuating the motor may rotate the first gear. The rotation of the first gear may cause each of the second and third gears to rotate. The amount of rotation may be determined by a gear ratio defined by a number of gear teeth of the drive gear to the number of gear teeth of the driven gear. In some variations, the gear ratio may be between about 5:1 to about 1:1. The gear ratio may be optimized to minimize the amount of electrical power required to actuate the gear system 1170. For example, in some variations, the gear ratio may be 5:1, 4:1, 3:1, 2:1 or 1:1. In some variations, there may be between 1 and 10 gears, such as 1, 2, 3, 4, 5, 6, 7, 8, 9, or 10 gears. Each of the gears may be coupled together, such that rotating one gear may cause every other gear to rotate. In further variations, each of the gears may not be coupled together, such that each gear may be independently rotated in response to an input. For example, each gear may be coupled to an electromagnet, such that each electromagnet may be controlled by an electrical signal.

The port system 1175 may be configured to transfer one or more gases to and/or from one or more of the bioreactor 1110, mixing chamber 1130, first thermal compartment 1140, second thermal compartment 1150, and third thermal compartment 1160. The port system 1175 may be configured to facilitate a gaseous environment within the bioreactor module 150 suitable for cell growth and/or culturing. The port system 1175 will be described in further detail with reference to FIG. 1F.

Figure 1D:
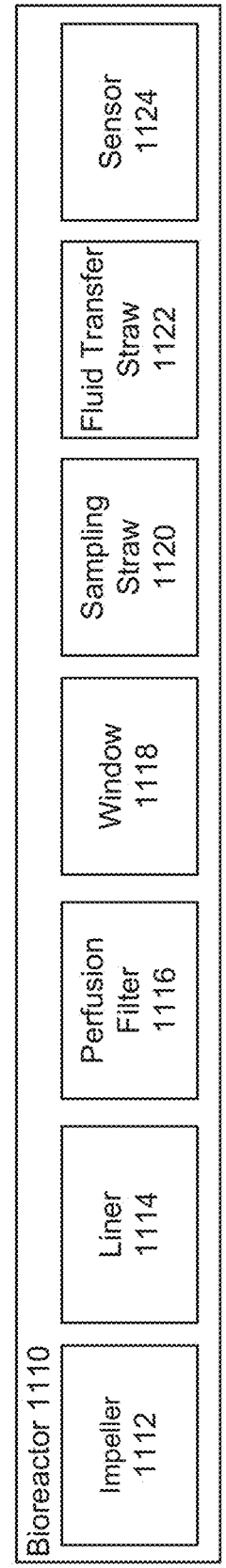
FIG. 1D is a block diagram of a bioreactor of the bioreactor module of FIG. 1C.

FIG. 1D shows a block diagram of the bioreactor 1110. The bioreactor 1110 may comprise an impeller 1112, a liner 1114, a perfusion filter 1116, a window 1118, a sampling straw 1120, and a fluid transfer straw 1122. The impeller 1112 may comprise a shaft and one or more impeller blades coupled to the shaft. The shaft may be configured to rotate, such that the impeller blade(s) rotate about an axis defined by the shaft. The impeller blade(s) may be configured to agitate a fluid. That is, the impeller blade(s) may comprise a shape configured to displace a volume of fluid. For example, the impeller blades may comprise a cross-sectional shape such as a rectangle, a triangle, a circle, or a combination thereof. The impeller 1112 may have between 1 and 10 impeller blades, including 1, 2, 3, 4, 5, 6, 8, or 10 impeller blades. The impeller 1112 may be configured rotate at a pre-determined rate, such as between about 1 rpm to about 2000 rpm, about 250 rpm to about 1500 rpm, about 500 rpm to about 1500 rpm, or about 1 rpm to about 1000 rpm, including about 100 rpm, 200 rpm, about 300 rpm, about 400 rpm, about 500 rpm, about 600 rpm, about 700 rpm, about 800 rpm, about 900 rpm, or about 1000 rpm. The pre-determined rate may be associated with a stirring process, which in turn may be associated with cell expansion. For example, the stirring process may be adjusted based on the type of cells contained within the cell solution. That is, certain cells (e.g., T cells) may tolerate relatively vigorous stirring and thus a relatively higher rate of rotation (e.g., about 1000 rpm) may be used. Other cells, such as human pluripotent stem cells (hPSCs), may only remain viable when relatively lower rates of rotation (e.g., about 100 rpm) are used.

The liner 1114 may be configured to be gas permeable. For example, a gas (e.g., air) introduced via a gas port may permeate through the liner 1114. The liner 1114 may be positioned along an inner surface of a sidewall of the bioreactor 1110. In some variations, the entire surface of the bioreactor sidewall(s) may be covered by the liner 1114. The liner 1114 may not be liquid permeable, such that a liquid may be retained within the bioreactor 1110. In some variations, the liner 1114 may be integrally formed with the bioreactor 1110. Accordingly, in some variations, the bioreactor 1110 may be gas permeable. The liner may be manufactured from a gas-permeable material, such as polydimethylsiloxane (PDMS), superhydrophobic polyvinylidene fluoride (PVDF), or superhydrophobic polyether sulfone (PES).

The perfusion filter 1116 may be configured to filter a fluid in a perfusion process. For example, the perfusion filter 1116 may comprise a substrate coupled to a fluid conduit. The substrate may comprise a plurality of openings configured to allow a liquid to flow therethrough while preventing cells from flowing therethrough. The fluid conduit may be configured to provide a suction force, such that fluid may be pulled from within the bioreactor 1110 through the plurality of openings of the substrate and into the fluid conduit during the perfusion process. The fluid conduit may be fluidically connected to a fluid manifold. The substrate of the perfusion filter 1116 may be positioned proximate an inner surface of a sidewall of the bioreactor 1110. The fluid conduit may extend through a top of the bioreactor 1110. The position of the fluid conduit in the top of the bioreactor 1110 may prevent unintentional fluid flow (e.g., leaks). In some variations, there may be a plurality of perfusion filters. For example, there may between 1 and 4 perfusion filters, such as 1, 2, 3, or 4 perfusion filters.

The fluid transfer straw 1122 may be configured to transfer fluid in and/or out of the bioreactor 1110. For example, the fluid transfer straw 1122 may comprise a fluid conduit that may be fluidically connected to a fluidic manifold. The fluid conduit may comprise a cross-sectional shape such as a circle, a square, a triangle, or a combination thereof. The fluid transfer straw 1122 may be coupled to a fluid transfer port positioned coupled to the bioreactor 1110. The fluid transfer straw 1122 may transfer fluid to the bioreactor 1110 via the fluid transfer port. For example, fluid may be transferred to the bioreactor after removing fluid via the perfusion filter 1116 in the perfusion process. In another example, fluid may be transferred to the bioreactor after removing fluid via the sampling straw 1120. In some variations, there may be a plurality of fluid transfer straws. For example, there may between 1 and 4 fluid transfer straws, such as 1, 2, 3, or 4 fluid transfer straws.

The sampling straw 1120 may be configured to transfer fluid out of the bioreactor 1110 for sampling. For example, the sampling straw 1120 may comprise a fluid conduit that may be fluidically connected to a fluidic manifold. The sampling straw 1120 may remove at least a portion (e.g., a sample) of the fluid within the bioreactor 1110 by applying a suction force through the opening. In some variations, the sampling straw 1120 may be configured to perform one or more measurements to the sample. For example, the sampling straw 1120 may measure a glucose value and/or a lactate value of the fluid. In further variations, the sample may be transferred from the sampling straw to the fluidic manifold, which in some variations may further transfer the sample to a portable fluid device and/or an analytical instrument. The analytical instrument may be configured to perform one or more measurements of the sample. The fluid conduit may comprise a cross-sectional shape such as a circle, a square, a triangle, or a combination thereof. The sampling straw 1120 may comprise an opening positioned within the bioreactor 1110. In some variations, there may be a plurality of sampling straws. For example, there may between 1 and 4 sampling straws, such as 1, 2, 3, 4, or even more sampling straws.

The window 1118 may be configured to facilitate one or measurements. For example, the window 1118 may be configured for optical detection. That is, the window 1118 may comprise a transparent material, such that a sensor positioned proximate the window 1118 may measure one or more parameters within the bioreactor 1110. The one or more parameters may be a fluid level, pH, temperature, and dissolved oxygen. The window may extend along a portion of a sidewall of the bioreactor 1110. In some variations, the window may be positioned along a bottom side of the bioreactor 1110. The window along the bottom side of the bioreactor 1110 may be operatively coupled to the sensor 1175, which may be optical sensor configured to measure pH and/or dissolved oxygen of a fluid contained within the bioreactor 1110. In further variations, the window may extend along the entire sidewall of the bioreactor 1110. For example, the bioreactor 1110 may be integrally formed with the window 1118. The window 1118 may be manufactured from a polymer (e.g., polyethylene terephthalate glycol, polymethyl methacrylate) or a glass. In some variations, there may be a plurality of windows. For example, there may be between 1 and 10 windows, 1 and 8 windows, or 1 and 4 windows, including 1, 2, 3, 4, 5, 6, 7, 8, 9, or 10 windows.

The sensor 1124 may be configured to measure one or more parameters within the bioreactor 1110. In some variations, the sensor 1124 may comprise a pressure sensor, a temperature sensor, an optical sensor, a humidity sensor, or a pH sensor. For example, the sensor 1124 may comprise a temperature sensor (e.g., thermistor, thermocouple) configured to measure a temperature of a fluid within the bioreactor 1110. The sensor 1124 may be positioned proximate a bottom surface of the bioreactor 1110, such that it may contact a liquid contained therein. For example, the sensor 1124 may be a liquid temperature sensor, such that a bulk temperature of the liquid within the bioreactor 1110 may be measured by the liquid temperature sensor. In further variations, the sensor 1124 may be a gas temperature sensor, such that a bulk temperature of the gas within the bioreactor 1110 may be measured by the temperature sensor. In such a variation, the sensor 1124 may be positioned proximate a top surface of the bioreactor, such that it may measure the temperature of gas within the bioreactor, but not the liquid, i.e., in these variations, the gas temperature sensor is not contact with the liquid contained within the bioreactor.

Figure 1E:
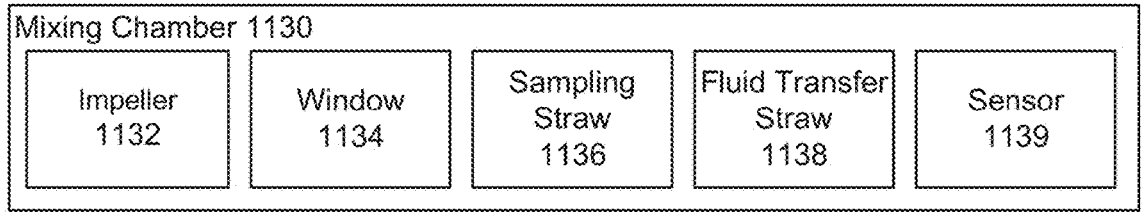
FIG. 1E is a block diagram of a mixing chamber of the bioreactor module of FIG. 1C.

FIG. 1E shows a block diagram of an illustrative mixing chamber 1130. The mixing chamber 1130 may comprise an impeller 1132, a window 1134, a sampling straw 1136, a fluid transfer straw 1138 and a sensor 1139. The impeller 1132 may correspond to the description provided for the impeller 1112 in reference to FIG. 1D. Similarly, the window 1134 may correspond to the description provided for the window 1118, the sampling straw 1136 may correspond to the description provided for the sampling straw 1120, the fluid transfer straw 1138 may correspond to the description provided for the fluid transfer straw 1122, and the sensor 1139 may correspond to the description provided for the sensor 1124 provided in reference to FIG. 1D.

Figure 1F:
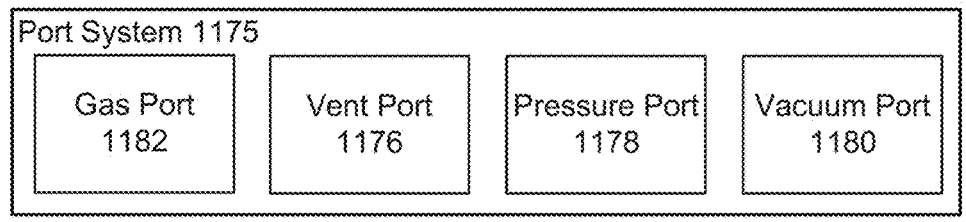
FIG. 1F is a block diagram of a port system of the bioreactor module of FIG. 1C.

FIG. 1F shows a block diagram of an illustrative port system 1175 configured to control a gaseous environment of the bioreactor module 150. The port system 1175 may comprise any number of suitable ports, for example, a gas port 1182, a vent port 1176, a pressure port 1178, and a vacuum port 1180. One or more of the gas port 1182, vent port 1176, pressure port 1178, and vacuum port 1180 may comprise an outlet coupled to a fluid conduit. The fluid conduit may be fluidically connected to a fluidic manifold. The fluidic manifold may transfer one or more gases to and/or from the bioreactor module 150 in response to a pre-determined workflow and/or one or more measurements generated by a sensor. That is, the port system 1175 may be configured to control the amount of gas above the liquid within the bioreactor, mixing chamber, and/or thermal compartments. i.e., the head space environment. For example, the gas port 1182 may be configured to transfer one or more gases to the bioreactor module 150 (e.g., the head space environment thereof). That is, the gas port 1182 may transfer nitrogen, oxygen, carbon dioxide, sterile air, or a combination thereof. In some variations, there may be a plurality of gas ports. For example, there may be between 1 and 10 gas ports, including 1, 2, 3, 4, 5, 6, 8, or 10 gas ports. The gas port 1182 may be fluidically connected to one or more of the bioreactor 1110, mixing chamber 1130, first thermal compartment 1140, second thermal compartment 1150, and third thermal compartment 1160. Accordingly, the gas port 1182 may be configured to provide an environment suitable for one or more cell processes throughout the bioreactor module 150 by transferring one or gases that may be consumed by cells and/or may maintain a pH of the fluid within a target range.

The vent port 1176 may be utilized in performing an integrity check of the bioreactor module 150 to determine if there is a leak. For example, the vent port 1176 may be configured transfer a fluid (e.g., gas) to the bioreactor module at a relatively higher pressure. For example, the relatively higher pressure may be between about 1 psi and 10 psi, including about 1 psi, 3 psi, or 5 psi, greater than the pre-existing pressure within the bioreactor module. The integrity check (e.g., leak test) may be used to determine one or more leaks within the bioreactor module. For example, the relatively higher pressure gas provided via the vent port 1176 may be observed for a pre-determined time period (e.g., an hour). A drop in the pressure divided by the pre-determined time period may determine a leak rate. A leak rate above a pre-determined threshold may indicate a leak (e.g., via a crack in a sidewall) within the bioreactor module 150. The integrity check may be performed before, during, and/or after any cell process described herein to validate the integrity of the bioreactor module 150.

The pressure port 1178 may be used to help reduce a pressure within the bioreactor module 150. The pressure port 1178 may be fluidically connected to a fluidic manifold by a fluid conduit. For example, in some variations, the pressure port 1178 may comprise a pressure relief valve configured to open in response to a given pressure measurement within the bioreactor module that exceeds a pre-determined threshold. The pre-determined threshold may correspond to a pressure, such as between about 1 psi and 5 psi, including 1, 2, 3, 4, or 5 psi. In another example, a sensor, such as a pressure sensor, may measure a pressure value within one or more of the bioreactor 1110, mixing chamber 1130, first thermal compartment 1140, second thermal compartment 1150, and third thermal compartment 1160 that exceeds a threshold measurement. In response, a controller may send an electrical signal to the pressure port 1178 to open and thereby allow transfer a fluid (e.g., gas) out of the bioreactor module 150 to reduce the pressure therein.

The vacuum port 1180 may be used to help transfer fluid (e.g., gas) out of the bioreactor module 150, such as when one or more of the bioreactor, mixing chamber, and thermal compartments may not contain cellular material. The vacuum port 1180 may be fluidically connected to a fluidic manifold by a fluid conduit. In some variations, the fluidic manifold may provide a suction force to the vacuum port 1180, which in turn may be applied to one or more of the bioreactor 1110, mixing chamber 1130, first thermal compartment 1140, second thermal compartment 1150, and third thermal compartment 1160. Accordingly, the suction may remove substantially all gases within any part the bioreactor module 150. The suction may establish an empty environment within the bioreactor module 150, such that one or more gases may be reintroduced via the gas port 1182.

Figure 1G:
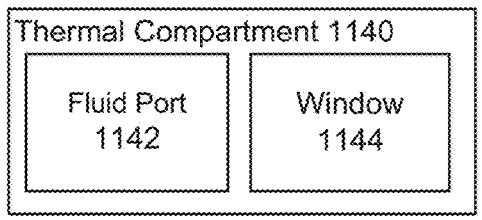
FIG. 1G is a block diagram of a first thermal compartment of the bioreactor module of FIG. 1C.
Figure 1H:
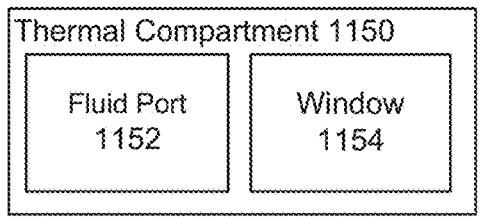
FIG. 1H is a block diagram of a second thermal compartment of the bioreactor module of FIG. 1C.
Figure 1I:
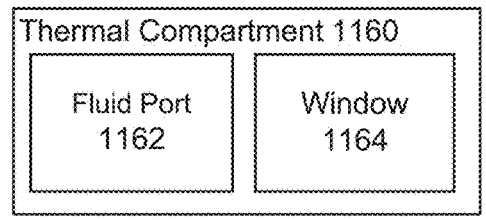
FIG. 1I is a block diagram of a third thermal compartment of the bioreactor module of FIG. 1C.

FIGS. 1G-1I are illustrative block diagrams of the first thermal compartment 1140, second thermal compartment 1150, and third thermal compartment 1160, respectively. In some variations, the thermal compartments 1140, 1150, 1160 may be referred to as intermediate cell containers, cell hotels, or compartments. The thermal compartments 1140, 1150, 1160 may be configured to house a fluid (e.g., cell solution) in a stable environment. Each respective thermal compartment 1140, 1150, 1160 may comprise a fluid port 1142, 1152, 1162 and a window 1144, 1154, 1164. The window 1144, 1154, 1164 may correspond to the description provided for the window 1118 in reference to FIG. 1D. The fluid port 1142, 1152, 1162 may be configured to transfer fluid in and/or out of the fluid thermal compartment 1140, 1150, 1160. The fluid port 1142, 1152, 1162 may be connected to a fluid conduit, which in turn may be fluidically connected to a fluidic manifold. Accordingly, the flow of fluid in and/or out of the thermal compartments 1140, 1150, 1160 may be controlled via the fluidic manifold. For example, a fluid may be transferred between the first thermal compartment 1140 and the bioreactor 1110. In another example, a fluid may be transferred between the first thermal compartment 1140 and the second thermal compartment 1150. In some variations, each of the thermal compartments 1140, 1150, 1160, bioreactor 1110, and mixing chamber 1130 may be fluidically connected.

The respective thermal compartments 1140, 1150, 1160 may be thermally coupled to one another, or to other components of the bioreactor module. That is, in some variations, the thermal compartments 1140, 1150, 1160 are maintained at the same temperature relative to each other, the bioreactor 1110 and/or the mixing chamber 1130. For example, heat may be transferred to and/or from the thermal compartments 1140, 1150, 1160 via the heat exchanger 1174. In another example, heat may be transferred through one or more sidewalls of the thermal compartments 1140, 1150, 1160. The compartments 1140, 1150, 1160 may also be thermally coupled to one or more of the bioreactor and mixing chamber. A stable thermal environment within the bioreactor module may help facilitate cell culturing by avoiding thermal shocks (e.g., rapid temperature changes that may harm or interrupt the cell culturing process) to a cell solution upon transferring the cell solution between one or more of the thermal compartments 1140, 1150, 1160, bioreactor 1110, and mixing chamber 1130.

FIGS. 3A-3E show an illustrative variation of a bioreactor module 300. The bioreactor module 300 may comprise a bioreactor 310, a mixing chamber 320, a first thermal compartment 340, a second thermal compartment 350), a third thermal compartment 360, a first plurality of fluid ports 370*a*, and a second plurality of fluid ports 370*b*. The plurality of fluid ports 370*a*. 370*b* may be positioned on a top surface of the bioreactor module 300. The plurality of fluid ports 370*a*. 370*b* may be configured to transfer a fluid to one or more of the bioreactor 310, mixing chamber 320, first thermal compartment 340, second thermal compartment 350, and third thermal compartment 360. That is, the plurality of fluid ports 370*a*. 370*b* may be fluidically connected to a fluidic manifold, such that a fluid may be transferred to and/or from the fluidic manifold the bioreactor module via the plurality of fluid ports 370*a*. 370*b*. The plurality of fluid ports 370*a*. 370*b* will be described in further detail with reference to FIG. 3E.

As shown, the bioreactor 310 may comprise a sidewall configured to contain a fluid. The sidewall of the bioreactor 310 may be coupled to a gas (e.g., air) permeable liner (not shown). Accordingly, the bioreactor 310 may be configured to retain a liquid while enabling a gas to flow through the sidewall. In some variations, the sidewall and/or gas permeable liner may be two-way permeable. In this way, the gas(es) within and around the bioreactor 310 may permeate such that equilibrium may be established between the bioreactor and adjacent components (e.g., one or more of the thermal compartments and mixing chamber). Additionally or alternatively, the gas permeability of the sidewall may avoid a build of pressure within the bioreactor 310. For example, a relatively high pressure may permeate through the gas permeable liner to a location with a lower pressure. The bioreactor may further comprise a bottom having a concave shape. The concave shape of the bottom may help prevent cells or other material from sticking to an inner surface thereof. Additionally, the concave shape of the bottom surface may provide a cavity for receiving the impeller blades to help allow the impeller blades to agitate substantially all cells contained within the bioreactor 310.

Figure 3A:
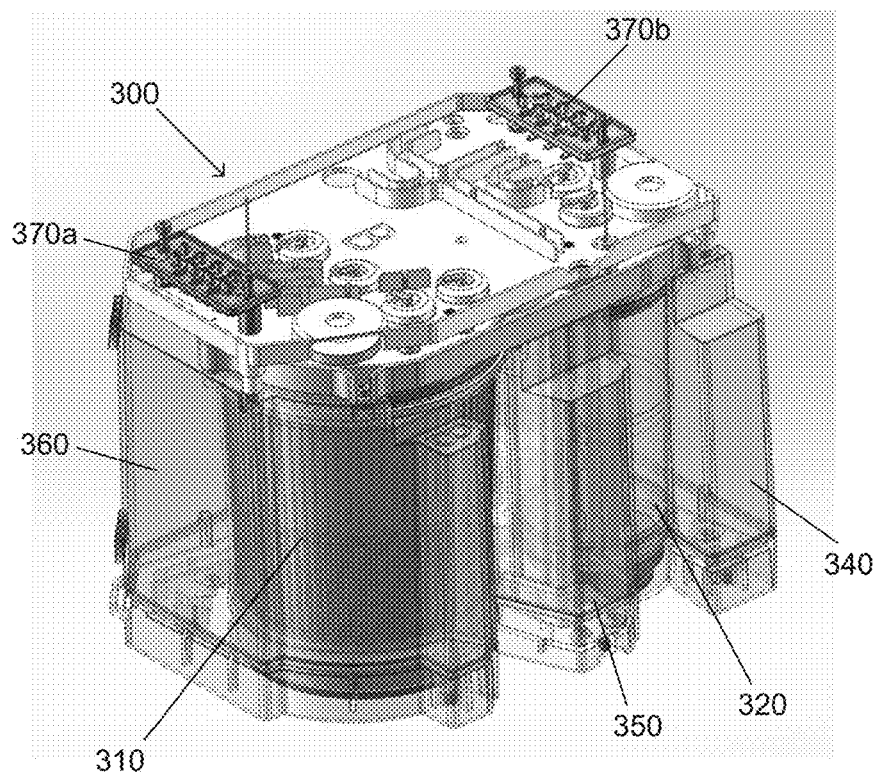
FIG. 3A is a front perspective rendering of an illustrative variation of a bioreactor module.
Figure 3B:
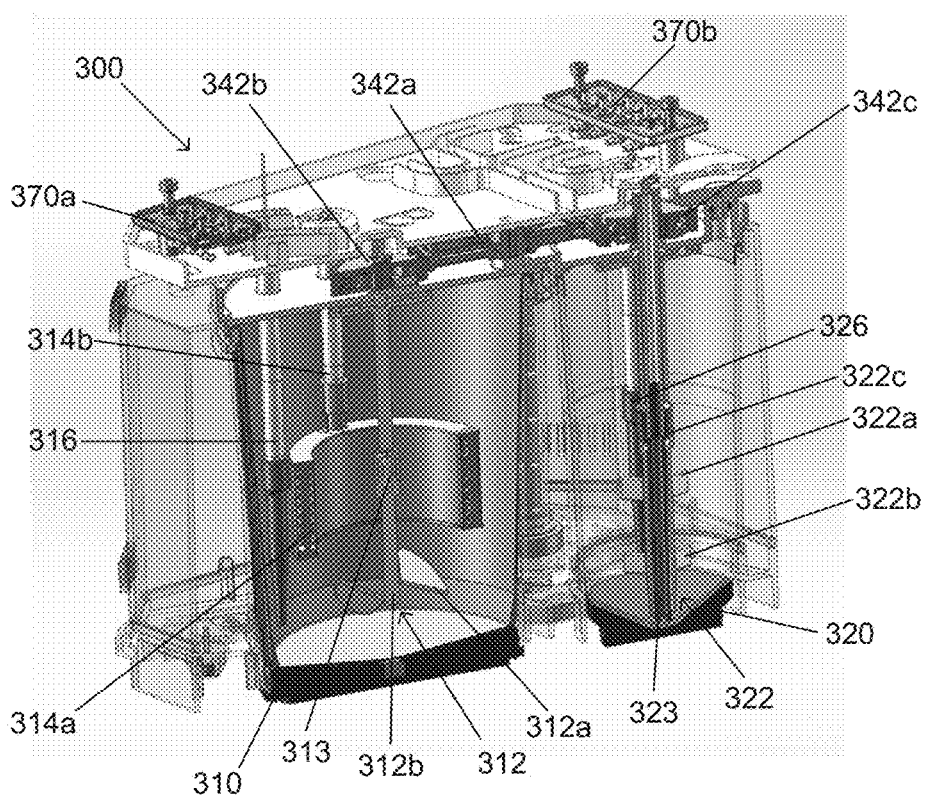
FIG. 3B is a front perspective cross-sectional rendering of the bioreactor module shown in FIG. 3A.
Figure 3D:
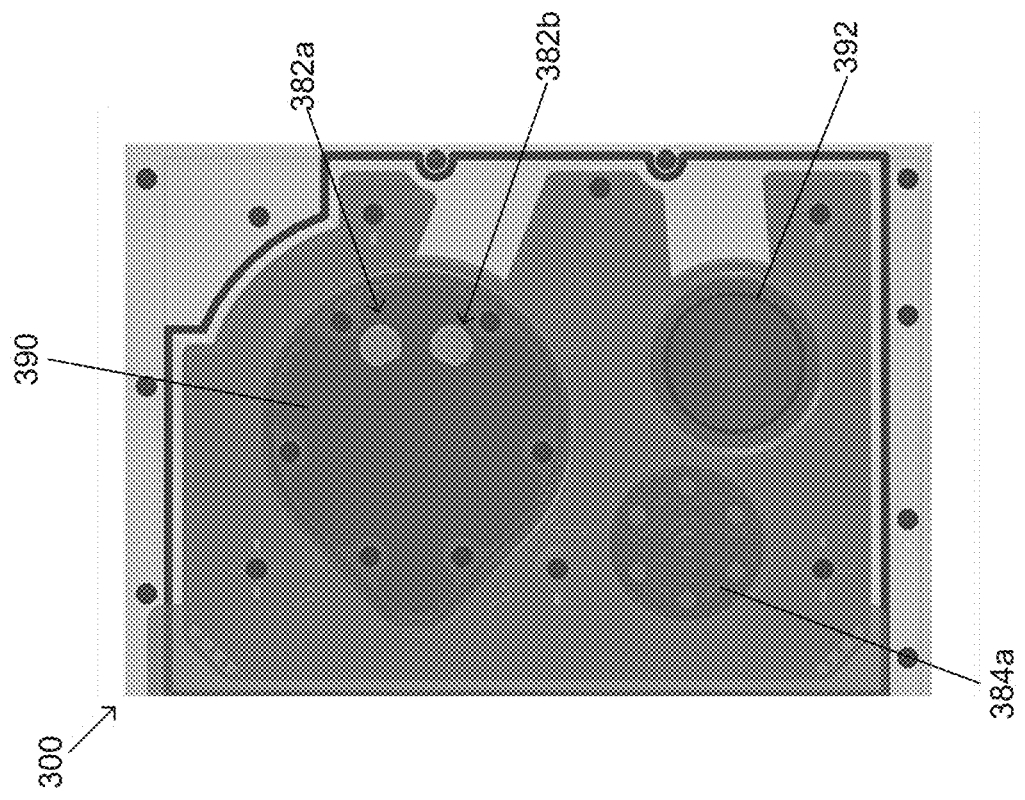
FIG. 3D is a bottom rendering of the bioreactor module shown in FIG. 3A.
Figure 3C:
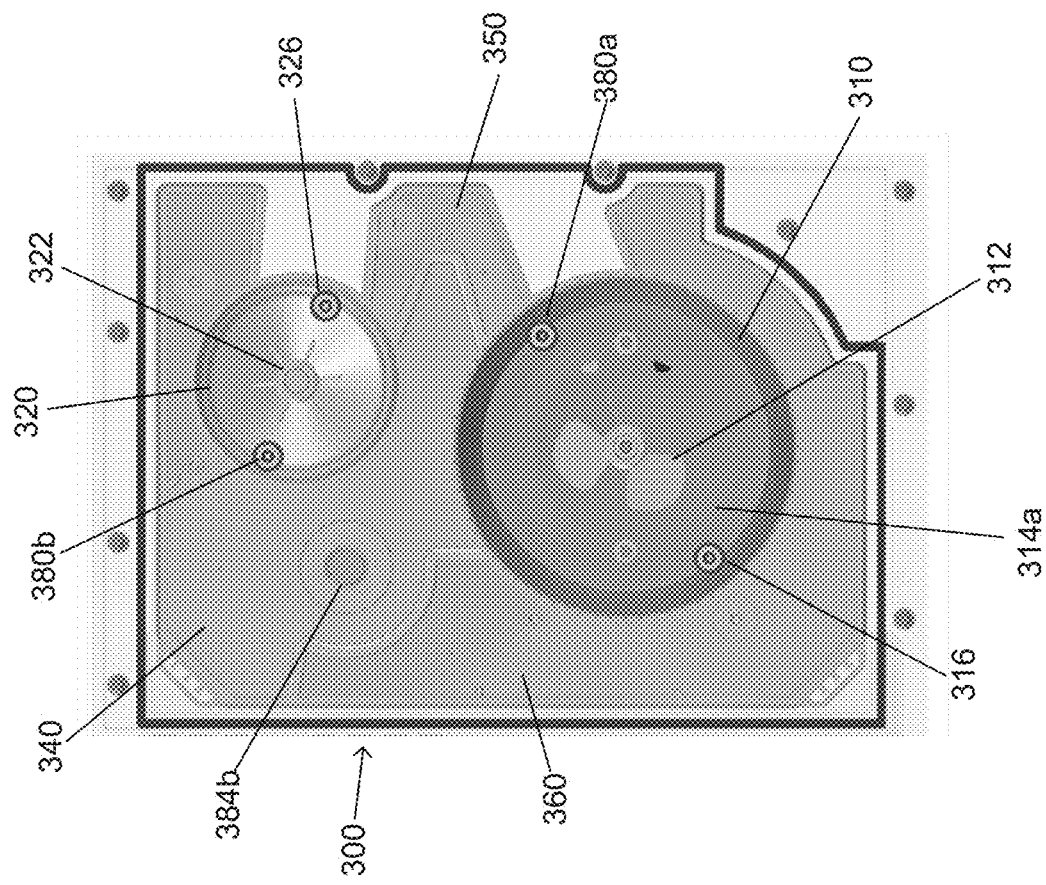
FIG. 3C is a top cross-sectional rendering of the bioreactor module shown in FIG. 3A.

As shown in FIGS. 3B-3C, the bioreactor 310 may comprise an impeller 312 having an impeller shaft 312*b* coupled to a plurality of impeller blades 312*a*, a perfusion filter 314*a* coupled to a fluid conduit 314*b*, a fluid transfer straw 313, and a sampling straw 316. The impeller shaft 312*b* may be positioned along a central axis defined by the bioreactor 310. The position of the impeller 312 may help facilitate evenly mixing a fluid contained therein. That is, the position of the impeller blades 312*b* proximate the bottom surface of the bioreactor 310 may facilitate forming a vortex when the impeller 312 is rotated, such that the vortex may mix or swirl substantially all of the fluid to facilitate homogeneity therein. The position of the impeller blades 312*a* may be a distal end of the impeller shaft 312*b*. That is, a proximal end of the shaft 312*b* may be operatively coupled to a top surface of the bioreactor 310 and the distal end may be proximate the bottom surface of the bioreactor 310. The impeller 312 may comprise any number of impeller blades as desirable, having any suitable geometry and/or configuration. In some variations, the impeller comprises three blades 312*a*, as shown in FIG. 3C. The impeller blades 312*a* may be pitched blades, which may help to gently stir the fluid without causing damage to cells therein. That is, the impeller blades 312*a* may be angled relative to the impeller shaft 312*b*. The angle of the impeller blades 312*a* may be between about 5 degrees and about 60 degrees, including about 45 degrees.

The fluid transfer straw 313 may be configured to transfer fluid to and/or from the bioreactor 310 to help facilitate one or more cell processing steps. For example, the fluid transfer straw 313 may be fluidically connected to a fluidic manifold, such that the fluidic manifold may provide a fluid to the bioreactor 310 via the fluid transfer straw. The fluid may be provided to perform a seeding process, transfer new media during a perfusion process (e.g., after media has been removed via the perfusion filter 314*a*), and/or perform a transfer of fluid from another part of the bioreactor module (e.g., the mixing chamber 320, thermal compartments 340, 350, 360). The fluid transfer straw 313 may be coaxial with the impeller shaft 312*b*. In some variations, the fluid transfer straw 313 may remain stationary while the impeller shaft 312*b* rotates about the fluid transfer straw 313.

The perfusion filter 314*a* may be configured to facilitate a perfusion process by retaining solid particles (e.g., cells) within the bioreactor 310 while allowing a liquid to flow therethrough. For example, the perfusion filter 314*a* may comprise a plurality of openings on one or more of an inner surface and an outer surface configured for liquid flow while preventing particulate flow therethrough. That is, the inner surface may define an inner diameter of the circumferential perfusion filter 314*a* and the outer surface may define an outer diameter thereof. Accordingly, the perfusion filter 314*a* may receive fluid (e.g., liquid) from either side. The perfusion filter 314*a* may extend circumferentially around an inner surface of the bioreactor 310. The perfusion filter 314*a* may be positioned around the impeller shaft 312*b* such that the impeller blades 312*a* may rotate freely. The perfusion filter 314*a* may comprise a height that is less than a height of the bioreactor 310. The height of the perfusion filter 314*a* relative to the bioreactor 310 may facilitate a perfusion process by keeping the perfusion filter 314*a* submerged within a fluid (e.g., liquid) that may be contained within the bioreactor 310. For example, the height of the perfusion filter 314*a* may be about ⅙ to about ½ of the of height of the bioreactor 310. The perfusion filter 314*a* may be coupled to the fluid conduit 314*b*. The fluid conduit 314*b* may be fluidically connected to the fluidic manifold. Accordingly, fluid removed from the bioreactor 310 via the perfusion filter 314*a* may be transferred to the fluidic manifold for further processing (e.g., additional filtering, disposal).

The sampling straw 316 may be configured to sample at least a portion of a fluid contained within the bioreactor 310. For example, the sampling straw may comprise an opening proximate the bottom surface of the bioreactor 310 such that the opening may be exposed to liquid. The sampling straw 316 may be further configured to measure one or more parameters of the sample. For example, the sampling straw 316 may comprise a lactate sensor, a glucose sensor, a pH sensor, a temperature sensor, and/or a dissolved oxygen sensor. The sampling straw 316 may be electrically connected to a controller, such as the controller 120. Accordingly, the one or more measurements obtained via the sampling straw 316 may be communicated to the controller 120. In some variations, there may be a gap between the opening of the sampling straw and the bottom surface of the bioreactor 310 to avoid clogging the opening. The sampling straw 316 may be positioned between the perfusion filter 314*a* and a sidewall of the bioreactor 310. In this way, the sampling straw 316 may not impede the rotation of the impeller 312 and/or the functionality of the perfusion filter 314*a*. That is, a gap may be maintained between the sampling straw 316 and each of the impeller 312 and perfusion filter 314*a*. In this way, a vortex formed by the impeller 312 may not be interrupted by the sampling straw 316.

The mixing chamber 320 may comprise an impeller 322 having an impeller shaft 322c coupled to a plurality of impeller blades 322a. 322b, a fluid transfer straw 323, and a sampling straw 326. The impeller shaft 322c may be positioned along a central axis defined by the mixing chamber 320. The position of the impeller 322 may facilitate evenly mixing a fluid contained therein. That is, the position of the impeller blades 322b proximate the bottom surface of the mixing chamber 320 may facilitate forming a vortex when the impeller 322 is rotated, such that the vortex may mix or swirl substantially all of the fluid to facilitate homogeneity therein. The mixing may be further facilitated by the additional impeller blades 322b positioned further from the bottom surface of the mixing chamber 320 along the impeller shaft 322c. That is, the additional impeller blades 322b may facilitate a more effective mixing process by extending a vortex vertically within the mixing chamber 320. Any number of impeller blades may be used, and the impeller blades may have any suitable geometry and/or configuration. In some variations, each impeller comprises three impeller blades, such that mixing chamber 320 may comprise a total of six impeller blades. In some variations, the impeller blades 322a. 322b are flat blades (e.g., a Rushton impeller design), which may be configured to vigorously stir the fluid. The impeller blades 312a may be coaxial with the impeller shaft 322c or, in some variations, may be angled relative to the impeller shaft 322c.

The impellers described herein may be coupled together to optimize for spatial constraints within the bioreactor module 300. For example, the impellers 312, 322 may each be coupled to one or more gears. As shown in FIG. 3B, the impeller 312 may be coupled to a gear 342b and the impeller 322 may be coupled to a gear 342c. The gears 342b. 342c may be coupled together by a gear 342a. Accordingly, rotation of the gear 342a may cause both of the gears 342b. 342c to rotate. In this way, the impellers 312, 322 may rotate in tandem and in response to a single input. That is, a single actuator may be used to rotate both impellers 312, 322. Advantageously, this may reduce the complexity during operations by minimizing the number of inputs required and/or reduce the number of actuators required to rotate the impellers 312, 322, which may reduce the overall size of the bioreactor module 300.

The fluid transfer straw 323 may be coaxial with the impeller shaft 322c. The fluid transfer straw 323 may be configured to transfer fluid to and/or from the mixing chamber 320. For example, the fluid transfer straw 323 may be fluidically connected to a fluidic manifold, such that the fluidic manifold may provide a fluid to the mixing chamber 320 via the fluid transfer straw. The fluid provided by the fluidic manifold may comprise one or more reagents, which may be combined with a cell solution within the mixing chamber 320. That is, the impeller 322 may be used to mix the one or more reagents with the cell solution. In some variations, the mixed solution may then be transferred to one or more of the thermal compartments 340, 350, 360 and bioreactor 310. In some variations, the fluid transfer straw 323 may remain stationary while the impeller shaft 322c rotates about the fluid transfer straw 323.

The sampling straw 326 may be configured to sample at least a portion of a fluid contained within the mixing chamber 320. For example, the sampling straw 326 may comprise an opening proximate the bottom surface of the mixing chamber 320 such that the opening may be exposed to liquid. Similar to the description provided for the sampling straw 316 of the bioreactor 310, the sampling straw 326 may be configured to measure one or more parameters of a fluid therein. There may be a gap between the opening of the sampling straw 326 and the bottom surface of the mixing chamber 320 to avoid clogging the opening. The sampling straw 326 may be positioned between the impeller 322 and a sidewall of the mixing chamber 320. In this way, the sampling straw 326 may not impede the rotation of the impeller 322 and/or a vortex formed by the impeller 322.

As shown in FIG. 3C, the bioreactor 310 and/or mixing chamber 320 may further comprise a sensor. For example, the bioreactor 310 may comprise a sensor 380a and the mixing chamber may comprise a sensor 380b. The sensors 380a, 380b may be configured to measure one or more parameters within the bioreactor 310 and mixing chamber 320, respectively. For example, the sensors 380a, 380b may comprise temperature sensors (e.g., thermistors) configured to measure a liquid temperature of a liquid contained within the respective component. The temperature measurements generated via the sensors 380a, 380b may be communicated to a controller. In response to the temperature measurements, the controller may adjust the temperature of the bioreactor 310 and/or mixing chamber 320 via the heat exchanger. For example, the controller may adjust the temperature to facilitate one or more cell processing steps. That is, in some variations, a given cell processing may be optimally performed a pre-determined temperature in accordance with a pre-determined workflow. For example, cell growth and/or division may be optimally performed at between about 15 degrees C. and about 25 degrees C., such as about 20 degrees C. Accordingly, the controller may utilize the heat exchanger to adjust the temperature of the bioreactor 310 and/or mixing chamber 320 so that the respective sensors 380a. 380b measure temperatures corresponding to the pre-determined temperature.

FIG. 3D shows a bottom view of the bioreactor module 300. The bioreactor 310 may comprise optical detection windows 382a, 382b, thermal pads 390, 392, and a magnetic base 384a. For example, as shown, the bioreactor 310 may comprise a first optical detection window 382a, a second optical detection window 382b. The optical detection windows 382a. 382b may be configured to facilitate measurements of one or more parameters. That is, the optical detection windows 382a. 382b may be positioned underneath a bottom side of the bioreactor 310 so that a parameter associated with a fluid (e.g., liquid) contained therein may be measured. For example, a sensor, such as the sensor 1173 described in reference to FIG. 1C, may be operatively coupled to the optical detection windows 382a. 382b. In some variations, the one or more parameters may be pH and dissolved oxygen. For example, the optical detection window 382a may comprise a pH detection window and the optical detection window 382b may comprise a dissolved oxygen window. In some variations, the pH and/or dissolved oxygen measurements may correspond to a response by the bioreactor module. That is, a pH measurement below or above a pre-determined value may initiate a perfusion process (e.g., media exchange) to bring the pH of the cell solution to the pre-determined value. In another example, a dissolved oxygen value below or above a pre-determined value may initiate a gas transfer process. The gas transfer process may comprise removing one or more gases from the bioreactor module via port system (e.g., port system 1175 described in reference to FIG. 1F) and transferring new gas (e.g., oxygen) to the bioreactor module. The measurements facilitated by the optical detection windows 382a. 382b may be evaluated in real-time by a controller, which may automatically (e.g., in a closed loop system) adjust one or more environmental conditions associated with the bioreactor module.

The bioreactor module 300 may have a thermal network configured to maintain a thermal environment thereof. For example, the bioreactor module 300 may comprise thermal pads 390, 392, which may be thermally connected to a heat exchanger, such as the heat exchanger 378 shown in FIG. 1E. The heat exchanger 378 may be configured to generate an amount of heat and/or remove an amount of heat from the bioreactor module 310 via the thermal pads 390, 392. For example, the heat exchanger 378 may comprise an electrical heat exchanger, such that an electrical signal may be provided to the heat exchanger 378 that controls the amount of heat provided to or removed from the bioreactor module 310 via the thermal pads 390, 392. The heat exchanger 378 may be thermally connected to the thermal pads 390, 392 by a thermal path. The thermal path(s) and thermal pads 390, 392 may comprise a thermally conductive metal, such as copper, aluminum, or an alloy thereof. The thermal pads 390, 392 may be configured to transfer heat to a component within the bioreactor module 300. For example, the thermal pad 390 may be positioned underneath a bottom surface of the bioreactor 310. That is, the thermal pad 390 may form a thermally conductive path with the bottom surface of the bioreactor 310. The thermal pad 390 may comprise a shape corresponding to the bottom surface of the bioreactor 310. That is, the thermal pad 390 may cover substantially all of the bottom surface of the bioreactor 310. Accordingly, the thermal pad 390 may transfer heat to, or receive heat from the bioreactor 310. In another example, the thermal pad 392 may be positioned underneath a bottom surface of the mixing chamber 320. That is, the thermal pad 392 may form a thermally conductive path with the bottom surface of the mixing chamber 320. The thermal pad 392 may comprise a shape corresponding to the bottom surface of the mixing chamber 320. That is, the thermal pad 390 may cover substantially all of the bottom surface of the mixing chamber 320. Accordingly, the thermal pad 392 may transfer heat to, or receive heat from the mixing chamber 320.

The bioreactor module 300 may further comprise a magnetic coupling configured to move one or more components of the bioreactor module 300. For example, the magnetic coupling may be configured to actuate (e.g., rotate) one or more gears and/or impellers. In some variations, the magnetic coupling may comprise the base 384a coupled to a shaft 384b shown in FIG. 3E. The base 384a may be separated from fluid via the bottom surface of the thermal compartment 340. In this way, the base 384a may avoid interactions with a fluid. The base 384a may receive an electrical signal, such as an electrical signal communicated by a controller. The base 384a may comprise one or magnets, such as electromagnets. For example, the electromagnet(s) may be configured to rotate in response to the electrical signal. The rotation of the base 384a may rotate the shaft 384b. The shaft 384b may be routed through the thermal compartment 340, such that it extends parallel to a vertical dimension of the bioreactor module 300. The shaft 384b may be coupled to a gear (not shown) positioned above the thermal compartment 340. An exemplary variation of the gear will be described with reference to FIGS. 4A-4B.

Figure 3E:
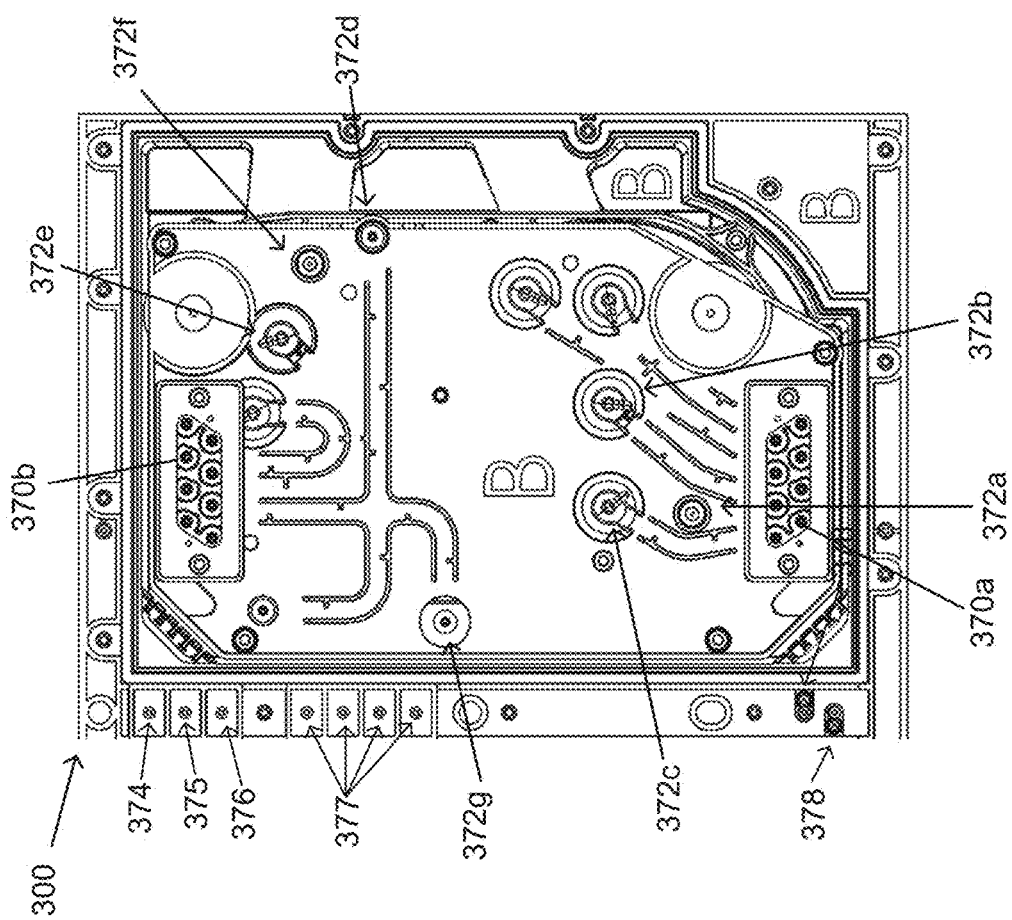
FIG. 3E is a top rendering of the bioreactor module shown in FIG. 3A.

FIG. 3E shows a top view of the bioreactor module 300. As shown, the bioreactor module 300 may further comprise a pressure port 374, a vacuum port 375, a vent port 376, a gas port 377, and a heat exchanger 378. Each of the pressure port 374, vacuum port 375, vent port 376, and gas port 377 may be fluidically connected to a fluidic manifold, such that the fluidic manifold may control the transfer of fluid (e.g., gases) to and/or from the bioreactor module 300. In some variations, the ports 374-377 may be coupled to more than one bioreactor module. For example, the ports 374-377 may be coupled to a first bioreactor module and a second bioreactor module. In such a variation, the environment of the first and second bioreactor modules may be maintained independently. That is, the ports 374-377 may be used to transfer gases to and/or from the first and second bioreactor modules without impacting the environment of the other bioreactor module.

In some variations, each of the pressure port 374, vacuum port 375, vent port 376, and gas port 377 may be utilized to help maintain a stable environment within the bioreactor module that is suitable for cell culturing. That is, the stable environment may comprise one or more nutrients necessary for cell culturing. For example, the gas port 377 may be configured to introduce one or more of nitrogen, oxygen, carbon dioxide, and sterile air to any portion of the bioreactor module. For example, oxygen, nitrogen, and/or carbon dioxide may be introduced to the mixing chamber and/or bioreactor. A portion of the oxygen, nitrogen, and/or carbon dioxide may dissolve into a fluid contained therein. In some variations, nitrogen and/or oxygen may be consumed by cells within the fluid during a cell culturing process. Carbon dioxide may be useful in maintaining a pH of the fluid within a target range (e.g., about 7.2 to about 7.4) by forming bicarbonate ions and hydrogen ions. In further variations, the sterile air may be provided to avoid introducing any gaseous particles that may otherwise inhibit the cell culturing process. If any undesired gaseous particles are introduced into the bioreactor module 300, the environment may be altered by removing at least a portion of the gas therein via the vacuum port 375.

The vent port 376 may be utilized to help facilitate a stable environment by helping to ensure the integrity of the bioreactor module. That is, a pressurized gas may be introduced through the pressure port 374 that may be used to perform an integrity test (e.g., leak test). For example, the pressurized gas may be introduced at a known pressure, the gas may be maintained within the bioreactor module for a known period of time, and the gas pressure subsequently measured. The difference in the initially known pressure and the measured pressure may be divided by the known period of time to determine a leak rate. An acceptably small (e.g., about zero) leak rate may indicate that the bioreactor module 300 is suitable for cell culturing. In some variations, the pressurized gas may subsequently be removed from the bioreactor module via the pressure port 374. In further variations, any gas above a pre-determined pressure may be removed from the bioreactor module via the pressure port 374.

As also shown in FIG. 3E, coupled to a top surface of the bioreactor module 300 may be the plurality of fluid ports 370a. 370b, which may be configured to transfer fluid in and/or out of the bioreactor module 300. For example, the plurality of fluid ports 370a may be fluidically connected to fluid transfer ports 372a-372d. Each of the fluid transfer ports 372a-372c may be fluidically connected to one or more components via a fluid conduit. For example, the fluid transfer port 372a may be fluidically connected to the sampling straw 316 of the bioreactor 310. The fluid transfer port 372b may be fluidically connected to the fluid transfer straw 313 of the bioreactor 310. The fluid transfer port 372c may be fluidically connected to the fluid conduit 314b and the perfusion filter 314a. In another example, the plurality of fluid ports 370b may be fluidically connected to fluid transfer ports 372*d*-372*g*. Each of the fluid transfer ports 372*d*-372*h* may be fluidically connected to one or more components. For example, the fluid transfer port 372*d* may be fluidically connected to the second thermal compartment 350. The fluid transfer port 372*e* may be fluidically connected to the fluid transfer straw 323 of the mixing chamber. The fluid transfer port 372*f* may be fluidically connected to the sampling straw 326 of the mixing chamber. The fluid transfer port 372*g* may be fluidically connected to the third thermal compartment 360.

Figure 4B:
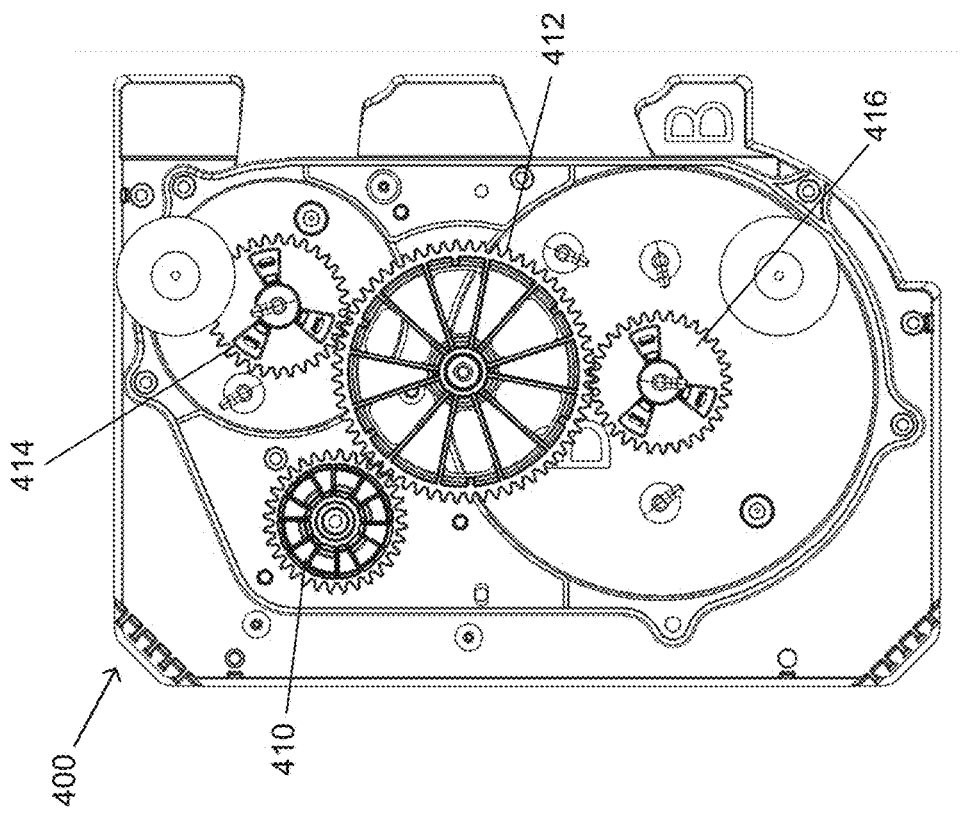
FIG. 4B is a top rendering of the gear system shown in FIG. 4A.
Figure 4A:
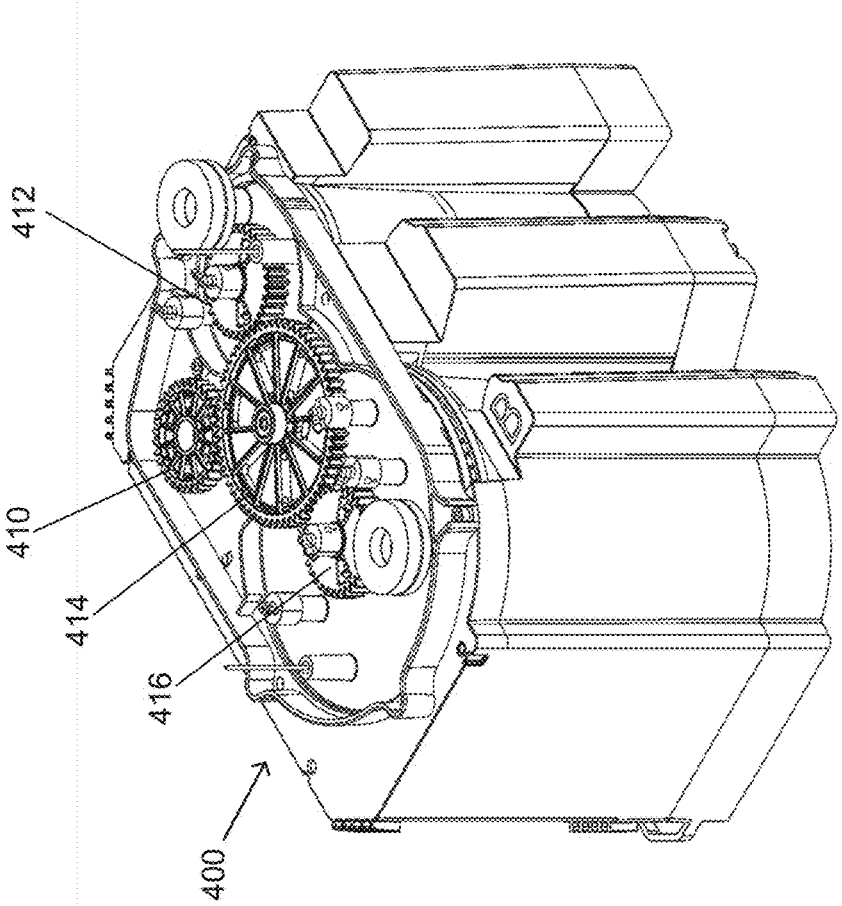
FIG. 4A is a perspective rendering of a gear system of a bioreactor module.

FIGS. 4A and 4B show an illustrative variation of a gear system for a bioreactor module 400 coupled to an intermediate surface thereof (e.g., underneath the top surface comprising the plurality of fluidic ports and conduits described in reference to FIG. 3E). The gear system may be configured to move (e.g., rotate) one or more impellers of the bioreactor module 400. The gear system may comprise any number of gears as desirable. In the variations shown in FIGS. 4A and 4B, there is a first gear 410, a second gear 412, a third gear 414, and a fourth gear 416. The first gear 410 may be coupled to an actuator. For example, the actuator may comprise an electromagnet. The electromagnet may be configured to receive an electrical signal that corresponds with a rate of rotation. The electrical signal may be provided by a controller. In some variations, the first gear 410 may be coupled to the shaft 384*b* described in reference to FIG. 3C. That is, the first gear 410 may be actuated by the one or more electromagnets of the magnetic base 384*a* coupled to the shaft 384*b*. The first gear 410 may be referred to as a drive gear and each of the second gear 412, third gear 414, and fourth gear 416 may be referred to as driven gears. That is, rotation of the first gear 410 may cause one or more of the second gear 412, third gear 414, and fourth gear 416 to rotate. Accordingly, the gears 410, 412, 414, 416 may be magnetically coupled. For example, the gear teeth of the first gear 410 may engage with the gear teeth of the second gear 412. The gear teeth of the second gear 412 may engage with the gear teeth of each of the third gear 414 and fourth gear 416. A ratio of the first gear 410 to the second gear 412 may be defined by the number of gear teeth of the first gear 410 to the number of gear teeth of the second gear 412. The ratio may be between 5:1 and 1:1, such as 5:1, 4:1, 3:1, 2:1 or 1:1. The ratio may be determined to minimize the electrical power required to rotate the gears and/or impellers while still facilitating the stirring processes described herein. The third gear 414 may be coupled to an impeller of a mixing chamber, such as the impeller 322 described in reference to FIG. 3B. The fourth gear 416 may be coupled to an impeller of a bioreactor, such as the impeller 312 described in reference to FIG. 3B. In some variations, the third gear 414 and fourth gear 416 may be equally sized, but need not be. A ratio of the second gear 412 to the third gear 414 and/or fourth gear 416 may be between 1:1 and 1:5, such as 1:1, 1:2, 1:3, 1:4, or 1:5.

II. Methods of Cell Processing

Generally, the systems and devices described herein may be used to perform one or more methods of cell processing, for example, in an automated cell processing workcell. The cell processing methods described herein may increase operational efficiency (e.g., reduce delays), reduce and/or eliminate manual intervention (e.g., labor), optimize workspace usage, and/or increase throughput of cell processing byproducts. In methods where the cell processing includes cell culturing, those methods may be performed automatically, such that a fluid (e.g., cell suspension, cell solution) may be provided to a bioreactor module of a cartridge, and when that cartridge is coupled to a corresponding instrument within a cell processing workcell, a cell culturing process may be performed. The cultured cells may then be transferred out of the bioreactor module and into a separate module of the cartridge as described above, and without human intervention.

Figure 5:
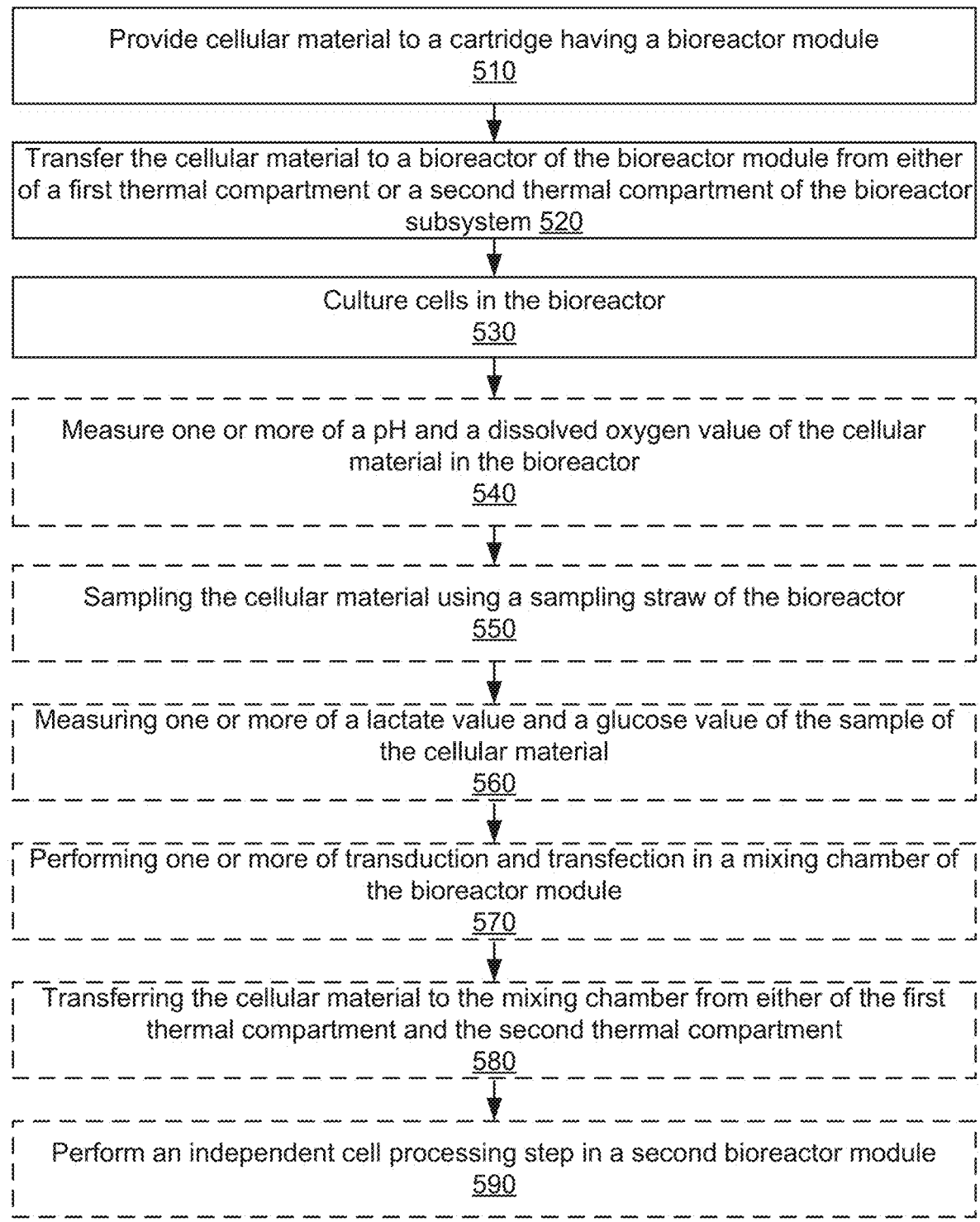
FIG. 5 is a flowchart of an illustrative variation of culturing cells using a bioreactor module.

FIG. 5 provides a flowchart of an illustrative method of cell processing in an automated cell processing workcell. As shown there, a method 501 may include providing cellular material to a cartridge having a bioreactor module 510. The cellular material may comprise a cell solution and may include one or more of cells (e.g., allogeneic cells), media, buffer, and reagents. The cellular material may be a liquid or, in some variations, may be frozen. In some variations, the cellular material may be provided to the cartridge by a fluidic manifold. In further variations, the cellular material may be provided by a portable fluid device, such as a sterile liquid transfer device coupled to a liquid transfer port of a liquid transfer port tray of the cartridge. The cellular material may be transferred to a bioreactor, thermal compartment, and/or mixing chamber of the bioreactor module. The method 501 may further include transferring the cellular material to the bioreactor of the bioreactor module from either the first thermal compartment or the second thermal compartment of the bioreactor module 520. For example, cellular material in liquid form may be transferred via a fluid port of the respective thermal compartment. The fluid port may be fluidically connected to a fluid conduit, which in turn may be fluidically connected to a fluidic manifold.

The method 501 may further include culturing cells in a bioreactor 530. Culturing the cells may be facilitated by performing one or more cell processing steps. For example, the bioreactor module may be configured to perform one or more of an expansion step, a transduction step, a transfection step, a perfusion step, a depletion step, a seeding step, and the like. The cells may be cultured via the one or more cell processing steps for a pre-determined period according to a pre-determined workflow. In some variations, the pre-determined period may be between about 6 hours and about 20 days, about 12 hours to about 15 days, or about 1 day to about 12 days, including 12 hours. 3 days. 6 days. 9 days. 12 days, or 15 days. One or more cell processing steps may be repeated throughout the pre-determined period. The cell culturing steps may be performed in the bioreactor, mixing chamber, and/or thermal compartments of the bioreactor module.

The method 501 may further include measuring one or more of a pH and a dissolved oxygen value of the cellular material in the bioreactor 540. For example, the pH and/or dissolved oxygen value may be measured by a sensor operatively coupled to a window of the bioreactor module. The window may be transparent. In some variations, the window may be positioned underneath a bioreactor, such that the sensor may measure one or more parameters of cellular material contained therein. In further variations, the window may be positioned in a sidewall of the bioreactor. The sensor may be within the bioreactor module. In some variations, the sensor may be coupled to a bioreactor instrument of the workcell. The sensor(s) described herein may be in communication with a controller, such that the controller may adjust one or more conditions of the bioreactor module in response to the one or more measurements. For example, oxygen may be transferred to the bioreactor to increase the dissolved oxygen levels of the fluid within the bioreactor in response to a dissolved oxygen measurement that is below a target value. In another example, carbon dioxide may be transferred to the bioreactor to increase the carbon dioxide levels of the fluid within the bioreactor in response to a pH measurement that is above a target value. In yet another example, carbon dioxide may be transferred out of the bioreactor to decrease the carbon dioxide levels of the fluid within the bioreactor in response to a pH measurement that is below a target value.

The method 501 may further include sampling the cellular material using a sampling straw of the bioreactor 550. For example, a sample of the cellular material may be removed from the bioreactor module via a sampling straw. In some variations, one or more of the bioreactor and mixing chamber may comprise a sampling straw. The sampling straw may remove a portion of the cellular material. For example, the sample may comprise a volume between about 0.5 mL to about 5 mL, including about 1 mL, 2 mL, 3 mL, 4 mL, or 5 mL. The sampling straw(s) may be fluidically connected to the fluidic manifold. The method 501 may further include measuring one or more of a lactate value and a glucose value of the sample of the cellular material 560. For example, the cartridge may comprise one or more sensors configured to measure one or more of a lactate value and a glucose value of the sample. That is, the one or more sensors may comprise a glucose sensor and/or a lactate sensor. In some variations, the sampling straw may be configured to measure glucose and/or lactate. Advantageously, measuring one or more of a lactate value and a glucose value within the cartridge may increase the efficiency of the cell processing described herein by reducing the time and/or steps required to obtain the lactate and/or glucose measurements. That is, the sampling, measuring, and/or evaluating measurements may be performed automatically (e.g., in a closed loop system). The lactate and/or glucose measurements may determine a response by the bioreactor module. For example, a perfusion process may be performed in response to a lactate measurement above a threshold value and/or a glucose measurement below a threshold value. That is, the media may be perfused (e.g., exchanged) so that the cells within the bioreactor may have sufficient levels of glucose while minimizing the levels of lactate. In another example, the fluidic manifold may transfer the sample of cellular material to an analytical instrument. The analytical instrument may be within the workcell (e.g., an online instrument) or, in some variations, may be outside of the workcell (e.g., an offline instrument). The analytical instrument may be configured to measure one or more a lactate value and a glucose value of the sample. The measurement(s) may be communicated to a controller for evaluation (e.g., comparison to a pre-defined condition).

The method 501 may further include performing one or more of transduction and transfection in a mixing chamber of the bioreactor module 570. For example, transduction may be performed by introducing a transduction reagent (e.g., a lentiviral vector and/or a virus) to a cell solution within the mixing chamber. The transduction reagent may be configured to target a specific cell type. Accordingly, the quantity (e.g., volume) of the transduction reagent may correspond to a cell concentration value (e.g., number of cells per unit volume) within the cell solution. The transduction reagent may be used to introduce, for example, a chimeric antigen receptor (CAR) to cells within the cell solution. In another example, a lentiviral vector comprising Lenti-CD19 CAR (scFv-41BB-CD3ζ, CTL019) may be configured to target CD19+ cells. Optionally, the vector solution may be stored frozen (e.g. at −80° C.) and thawed and/or warmed shortly before being conveyed to the bioreactor module. Cells culturing in the presence of the viral or non-viral vector may result in transduction of the cells by the viral or non-viral vector. In another example, transfection may be performed by introducing a transfection reagent (e.g., a nucleic acid) to a cell solution within the mixing chamber by a nonviral method. Transfection may be configured to knock-out certain cell types that may be associated with eliciting immune responses (e.g., graft vs host disease) in subsequent patients. The transfection reagent may comprise a liquid nanoparticle (LNP). The transduction and/or transfection reagent may be mixed with the cellular material using an impeller of the mixing chamber. The impeller may be controlled by a controller configured to send electrical signals to an actuator, such as an electromagnet coupled to the impeller. In some variations, the transduction and/or transfection may be performed in the bioreactor. For example, the bioreactor may also comprise an impeller, which may be magnetically coupled to the impeller of the mixing chamber, but need not be.

The method 501 may further include transferring the cellular material to the mixing chamber from either of the first thermal compartment and the second thermal compartment 580. For example, cellular material may be removed from the respective thermal compartment via a fluid port thereof. The fluid port may be fluidically connected to a fluid conduit, which in turn may be fluidically connected to the fluidic manifold. Accordingly, the fluidic manifold may control the transferring of cellular material. The fluidic manifold may comprise one or more valves to control the fluid flow therethrough. The one or more valves may be individually actuated by a controller. In some variations, the cellular material may be transferred to a second bioreactor module of the cartridge. Accordingly, the method 501 may further include performing independent cell processing steps in each of the bioreactor modules 590. That is, for example, different reagents may be provided to each of the bioreactor modules to facilitate one or more cell processing steps. In another example, the bioreactor modules may be independently controllable such that any impellers, heat exchangers, and/or fluid transfer therein may not impact the other bioreactor module. In some variations, the bioreactor modules may be thermally coupled, such that the thermal environment of the two bioreactor modules may be the same. Thermally coupling the bioreactor modules may advantageously reduce the operational complexity and/or components required to perform the cell processing described herein.

Throughout this application, the term "about" is used to indicate that a value includes the inherent variation of error for the device or the method being employed to determine the value, or the variation that exists among the samples being measured. Unless otherwise stated or otherwise evident from the context, the term "about" means within 10% above or below the reported numerical value (except where such number would exceed 100% of a possible value or go below 0%). When used in conjunction with a range or series of values, the term "about" applies to the endpoints of the range or each of the values enumerated in the series, unless otherwise indicated. As used in this application, the terms "about" and "approximately" are used as equivalents.

While embodiments of the present invention have been shown and described herein, those skilled in the art will understand that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A cartridge for automated cell processing comprising:
    a bioreactor module comprising a bioreactor, a first thermal compartment positioned adjacent the bioreactor, and a second thermal compartment positioned adjacent the bioreactor, wherein the first thermal compartment and the second thermal compartment interlock with one another; and
    a fluidic manifold coupling the first and second thermal compartments to the bioreactor.

2. The cartridge of claim 1, wherein the first thermal compartment and the second thermal compartment are configured to hold volumes of different amounts.

3. The cartridge of claim 1, wherein the first thermal compartment is configured to hold a volume of about 600 mL and the second thermal compartment is configured to hold a volume of about 100 mL.

4. The cartridge of claim 1, wherein bioreactor comprises one or more of an impeller, an air permeable liner, a sampling straw, and a perfusion filter.

5. The cartridge of claim 1, further comprising a mixing chamber configured to receive one or more cell processing reagents, wherein the mixing chamber comprises an impeller.

6. The cartridge of claim 5, wherein one or more of the bioreactor, first thermal compartment, second thermal compartment, and the mixing chamber are fluidically connected.

7. The cartridge of claim 5, wherein the bioreactor comprises an impeller, and wherein the impeller of the mixing chamber and the impeller of the bioreactor are coupled together.

8. The cartridge of claim 5, wherein one or more of the bioreactor, the first thermal compartment, the second thermal compartment, and the mixing chamber has a window for optical detection.

9. The cartridge of claim 1, further comprising a third thermal compartment positioned adjacent the bioreactor.

10. The cartridge of claim 9, wherein the third thermal compartment is configured to hold a volume of about 600 mL.

11. The cartridge of claim 9, wherein the third thermal compartment has a window configured for optical detection.

12. The cartridge of claim 1, further comprising a second bioreactor module.

13. The cartridge of claim 12, wherein the bioreactor modules are thermally coupled.

14. A method of cell processing, comprising:
    providing cellular material to a cartridge having a bioreactor module comprising a bioreactor, a first thermal compartment positioned adjacent the bioreactor, a second thermal compartment positioned adjacent the bioreactor, and a mixing chamber;
    transferring the cellular material to the bioreactor from either the first thermal compartment or the second thermal compartment; and
    culturing cells in the bioreactor.

15. The method of claim 14, wherein the cells are cultured for about 12 hours to about 15 days.

16. The method of claim 14, wherein the bioreactor is configured to perform one or more of a static process, a stirring process, and a perfusion process.

17. The method of claim 14, further comprising measuring one or more of a pH value and a dissolved oxygen value of the cellular material in the bioreactor.

18. The method of claim 14, further comprising sampling the cellular material using a sampling straw of the bioreactor.

19. The method of claim 18, further comprising measuring one or more of a lactate value and a glucose value of the sample of the cellular material.

20. The method of claim 14, further comprising performing one or more of transduction and transfection in the mixing chamber.

21. The method of claim 14, further comprising transferring the cellular material to the mixing chamber from either of the first thermal compartment and the second thermal compartment.

22. The method of claim 14, wherein the cartridge further comprises a second bioreactor module.

23. The method of claim 22, further comprising performing independent cell processing steps in each of the bioreactor modules.

24. A cartridge for automated cell processing comprising:
    a bioreactor module comprising a bioreactor, a first thermal compartment positioned adjacent the bioreactor, and a second thermal compartment positioned adjacent the bioreactor, wherein the first thermal compartment and the second thermal compartment are engaged and share a sidewall; and
    a fluidic manifold coupling the first and second thermal compartments to the bioreactor.

25. The cartridge of claim 24, wherein the first and second thermal compartments comprise complementary shapes that correspond to each other.

26. The cartridge of claim 24, wherein the first and second thermal compartments are thermally coupled to maintain thermal equilibrium therebetween.

27. The cartridge of claim 24, wherein the first and second thermal compartments are fluidically connected via the fluidic manifold.

* * * * *